(12) United States Patent
Fukuda

(10) Patent No.: US 11,866,600 B2
(45) Date of Patent: Jan. 9, 2024

(54) METHOD FOR FORMING COATING FILM

(71) Applicant: KAO CORPORATION, Tokyo (JP)

(72) Inventor: Teruyuki Fukuda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 324 days.

(21) Appl. No.: 17/311,066

(22) PCT Filed: Nov. 22, 2019

(86) PCT No.: PCT/JP2019/045886
§ 371 (c)(1),
(2) Date: Jun. 4, 2021

(87) PCT Pub. No.: WO2020/116215
PCT Pub. Date: Jun. 11, 2020

(65) Prior Publication Data
US 2022/0041882 A1 Feb. 10, 2022

(30) Foreign Application Priority Data
Dec. 7, 2018 (JP) .................................. 2018-230171

(51) Int. Cl.
*C09D 11/54* (2014.01)
*B41M 7/00* (2006.01)
(Continued)

(52) U.S. Cl.
CPC .......... *C09D 11/54* (2013.01); *B41M 7/0027* (2013.01); *C09D 11/033* (2013.01);
(Continued)

(58) Field of Classification Search
CPC ..... C09D 11/54; C09D 11/033; C09D 11/102; C09D 11/107; C09D 11/30; C09D 7/20;
(Continued)

(56) References Cited

U.S. PATENT DOCUMENTS

2002/0047884 A1  4/2002  Nagashima et al.
2007/0258932 A1  11/2007  Bui
(Continued)

FOREIGN PATENT DOCUMENTS

CN  101084864 A  12/2007
CN  102485341 A  6/2012
(Continued)

OTHER PUBLICATIONS

Extended European Search Report dated Jul. 7, 2022 in European Patent Application No. 19892220.5, 9 pages.
(Continued)

*Primary Examiner* — Matthew Luu
*Assistant Examiner* — Alexander D Shenderov
(74) *Attorney, Agent, or Firm* — Oblon, McClelland, Maier & Neustadt, L.L.P.

(57) ABSTRACT

The present invention relates to a method for forming a coating film including a step 1 of applying a liquid composition I containing a solvent A, a solvent B, and a polymer C to a base material; and a step 2 of applying droplets of a liquid II containing water to the liquid composition I on the base material as applied in the step 1, wherein a boiling point of the solvent A is lower than 99° C., and a distance Ra of the Hansen solubility parameter of the solvent A to water is 36 or less; a boiling point of the solvent B is 150° C. or higher, and a distance Ra of the Hansen solubility parameter of the solvent B to water is 40 or more; and the solvent B is compatible with the solvent A, the polymer C is soluble in the solvent A but insoluble in the solvent B, and an average diameter d of the droplets applied in the step 2 is 0.01 μm or more and 50 μm or less.

20 Claims, 6 Drawing Sheets

(51) Int. Cl.
*C09D 11/033* (2014.01)
*C09D 11/102* (2014.01)
*C09D 11/107* (2014.01)
*C09D 11/30* (2014.01)

(52) U.S. Cl.
CPC .......... *C09D 11/102* (2013.01); *C09D 11/107* (2013.01); *C09D 11/30* (2013.01)

(58) Field of Classification Search
CPC ...... B41M 7/0027; B05D 3/007; B05D 3/107; B05D 1/42; B05D 5/061; B05D 1/26; B05D 2401/10; B05D 1/36
USPC .......................................................... 347/101
See application file for complete search history.

(56) References Cited

U.S. PATENT DOCUMENTS

| | | | |
|---|---|---|---|
| 2009/0079784 A1* | 3/2009 | Chiwata | C09D 11/54 347/21 |
| 2010/0150850 A1 | 6/2010 | Tamor et al. | |
| 2013/0017334 A1 | 1/2013 | Nakano et al. | |
| 2013/0280198 A1 | 10/2013 | Cavazutti et al. | |
| 2014/0364394 A1 | 12/2014 | Tamura et al. | |
| 2017/0237012 A1 | 8/2017 | Shen et al. | |
| 2018/0056691 A1* | 3/2018 | Arai | C09D 11/101 |
| 2018/0257104 A1 | 9/2018 | Che et al. | |
| 2019/0002722 A1 | 1/2019 | May et al. | |
| 2019/0010339 A1 | 1/2019 | Mitsumoto et al. | |
| 2019/0023922 A1* | 1/2019 | Koyama | C08G 18/792 |
| 2019/0209994 A1 | 7/2019 | Katayama et al. | |
| 2019/0276683 A1 | 9/2019 | Asaishi | |
| 2019/0315087 A1 | 10/2019 | Macor | |
| 2019/0343731 A1 | 11/2019 | Amari et al. | |

FOREIGN PATENT DOCUMENTS

| | | |
|---|---|---|
| CN | 102844388 A | 12/2012 |
| CN | 107109090 A | 8/2017 |
| CN | 108290432 A | 7/2018 |
| EP | 3 511 368 A1 | 7/2019 |
| JP | 58-164622 A | 9/1983 |
| JP | 2009-191152 A | 8/2009 |
| JP | 2010-520943 A | 6/2010 |
| JP | 2012-126907 A | 7/2012 |
| JP | 2014-58626 A | 4/2014 |
| JP | 5923677 B1 | 5/2016 |
| JP | 2018-512265 A | 5/2018 |
| JP | 2018-90739 A | 6/2018 |
| JP | 2018-123208 A | 8/2018 |
| WO | WO 2008/044630 A1 | 4/2008 |
| WO | WO 2013/100207 A1 | 7/2013 |
| WO | WO 2016/199391 A1 | 12/2016 |
| WO | WO 2017/056760 A1 | 4/2017 |
| WO | WO 2017/102049 A1 | 6/2017 |
| WO | WO 2018/051794 A1 | 3/2018 |
| WO | WO 2018/069874 A1 | 4/2018 |
| WO | WO 2018/124227 A1 | 7/2018 |

OTHER PUBLICATIONS

Julia Syurik, et al., "Bio-inspired, large scale, highly-scattering films for nanoparticle-alternative white surfaces," Scientific Reports, XP002782691, Apr. 21, 2017, 11 pages.

Charles M. Hansen, "Hansen Solubility Parameters—A User's Handbook, Second Edition," CRC Press, XP055508066, 2007, 7 pages.

International Search Report dated Feb. 25, 2020 in PCT/JP2019/045886 filed on Nov. 22, 2019 (3 pages).

* cited by examiner

METHOD FOR FORMING COATING FILM

FIELD OF THE INVENTION

The present invention relates to a method for forming a coating film.

BACKGROUND OF THE INVENTION

Conventionally, in the electronics field, the medical field, and the like, the technologies for giving fine and regular shapes, such as fine pores and concavo-convex shapes, to surfaces of materials have been investigated, and the technologies utilizing a self-organized structure in which by placing a polymer solution or the like in a fixed environment, order or regularity is spontaneously formed have been proposed.

For example, JP 58-164622 A (PTL 1) aims at providing bodies and so on having a porous structure and also having adjustable total pore volume, adjustable pore size, and adjustable pore walls, and describes a method for producing porous bodies in which a polymer is dissolved through heating above the upper critical temperature in a mixture of two compounds A and B, which are liquid and miscible at the dissolving temperature, whereby the employed mixture composed of the polymer, the compound A, and the compound B displays in liquid aggregate state a miscibility gap, the compound A being a solvent for the polymer, and the compound B raising the phase separation temperature of a solution composed of the polymer and the compound A, the solution if necessary being shaped and brought to dissociation and setting by cooling, and the components A and/or B if necessary being extracted.

In addition, JP 2018-512265 (PTL 2) describes a method of forming a textured surface, including: dissolving a solid in a solvent to form a solution, the solid having a concentration less than a first saturation concentration of the solid in the solvent at a first temperature and greater than a second saturation concentration of the solid in the solvent at a second temperature; allowing the solution to cool to the second temperature to form a solid particle solution; disposing the solid particle solution on a surface; and allowing the solvent to evaporate to form the textured surface.

SUMMARY OF THE INVENTION

The present invention relates to the following [1].

[1] A method for forming a coating film including:

Step 1: a step of applying a liquid composition I containing a solvent A, a solvent B, and a polymer C to a base material; and Step 2: a step of applying droplets of a liquid II containing water to the liquid composition I on the base material as applied in the step 1, wherein a boiling point of the solvent A is lower than 99° C., and a distance Ra of the Hansen solubility parameter of the solvent A to water as expressed by the following equation (1) is 36 or less, a boiling point of the solvent B is 150° C. or higher, and a distance Ra of the Hansen solubility parameter of the solvent B to water as expressed by the following equation (1) is 40 or more, and the solvent B is compatible with the solvent A, the polymer C is soluble in the solvent A but insoluble in the solvent B, and an average diameter d of the droplets applied in the step 2 is 0.01 µm or more and 50 µm or less, $$Ra = (4 \times \Delta D^2 + \Delta P^2 + \Delta H^2)^{0.5} \quad (1)$$

wherein,

ΔD is a difference of dispersing component in the Hansen solubility parameter between a solvent and water, ΔP is a difference of polar component in the Hansen solubility parameter between a solvent and water, and ΔH is a difference of hydrogen-binding component in the Hansen solubility parameter between a solvent and water.

DETAILED DESCRIPTION OF THE INVENTION

Figure 1:
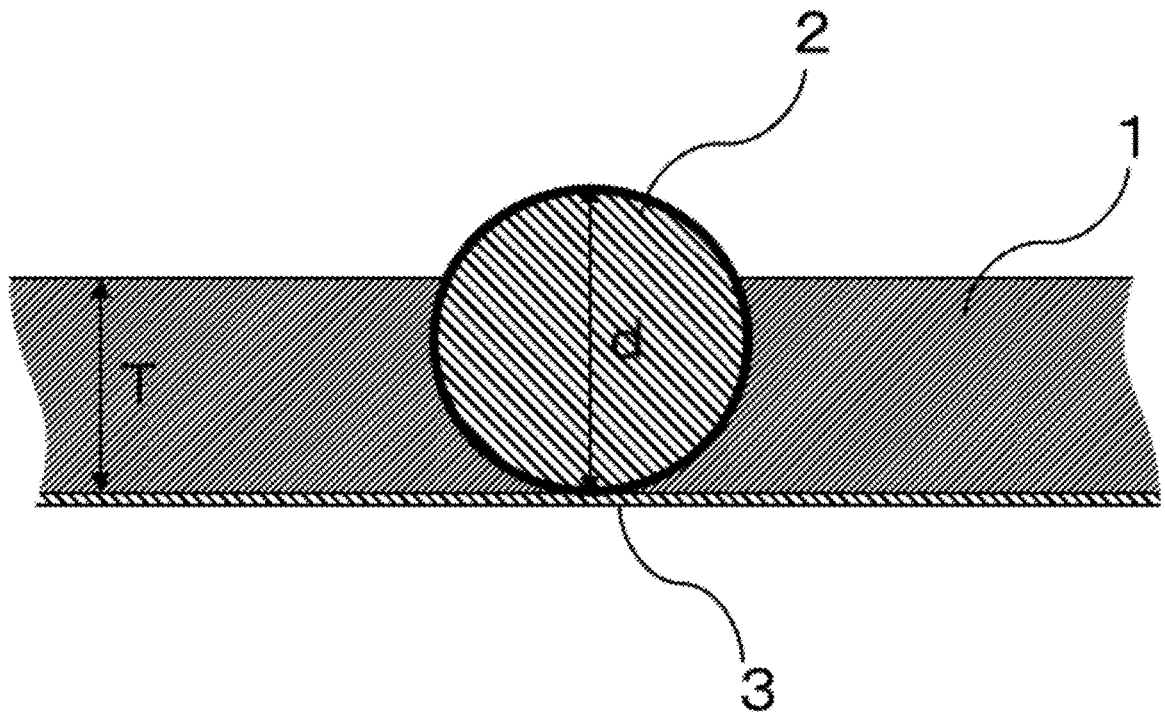
FIG. 1 is a schematic view showing one example of a cross section in which a droplet is applied to the liquid composition I applied on a base material by the method for forming a coating film of the present invention.

In PTL 1, the porous body is formed by regulating the temperature of the mixture containing a polymer, and therefore, the regulation of the pore diameter is not sufficient. In addition, according to the technology of PTL 2, since the textured surface is formed by forming the solid particle solution and disposing the solid particle solution on the surface, the characteristics of the textured surface vary with the particle diameter of the solid particle, and hence, such is not sufficient for controlling the characteristics of the textured surface. For that reason, a method for forming a coating film in which the properties of the surface can be controlled more simply and precisely, and as a result, the optical characteristics can be exhibited is demanded.

The present invention relates to a method for forming a coating film capable of exhibiting optical characteristics simply and precisely.

The present inventor has found that in a method including a step of applying a liquid composition containing two kinds of solvents each having a predetermined boiling point and a polymer to a base material and a step of applying droplets of a liquid containing water to the liquid composition on the base material as applied in the foregoing step, by setting the Hansen solubility parameters of these two kinds of solvents to water to a prescribed range, respectively, allowing the compatibilities of the two kinds of solvents and the solubility of the polymer in each of the solvents to fall in a specified relation, respectively, and setting the average diameter of the droplets to be applied to the liquid composition to a predetermined range, a coating film containing secondary particles having primary particles accumulated therein is formed, and even without using an inorganic pigment, optical characteristics of high whiteness and improved concealment are expressed.

Specifically, the present invention relates to a method for forming a coating film including:

Step 1: a step of applying a liquid composition I containing a solvent A, a solvent B, and a polymer C to a base material; and Step 2: a step of applying droplets of a liquid II containing water to the liquid composition I on the base material as applied in the step 1, wherein a boiling point of the solvent A is lower than 99° C., and a distance Ra of the Hansen solubility parameter of the solvent A to water as expressed by the following equation (1) is 36 or less, a boiling point of the solvent B is 150° C. or higher, and a distance Ra of the Hansen solubility parameter of the solvent B to water as expressed by the following equation (1) is 40 or more, and the solvent B is compatible with the solvent A, the polymer C is soluble in the solvent A but insoluble in the solvent B, and an average diameter d of the droplets applied in the step 2 is 0.01 μm or more and 50 μm or less, $$Ra = (4 \times \Delta D^2 + \Delta P^2 + \Delta H^2)^{0.5} \quad (1)$$

wherein, $\Delta D$ is a difference of dispersing component in the Hansen solubility parameter between a solvent and water, $\Delta P$ is a difference of polar component in the Hansen solubility parameter between a solvent and water, and $\Delta H$ is a difference of hydrogen-binding component in the Hansen solubility parameter between a solvent and water.

In accordance with the present invention, it is possible to provide a method for forming a coating film capable of exhibiting optical characteristics simply and precisely.

[Forming Method of Coating Film]

The method for forming a coating film of the present invention includes Step 1: a step of applying a liquid composition I containing a solvent A, a solvent B, and a polymer C (hereinafter also referred to as "liquid composition I") to a base material; and Step 2: a step of applying droplets of a liquid II containing water to the liquid composition I on the base material as applied in the step 1, wherein a boiling point of the solvent A is lower than 99° C., and a distance Ra of the Hansen solubility parameter of the solvent A to water as expressed by the following equation (1) is 36 or less; a boiling point of the solvent B is 150° C. or higher, and a distance Ra of the Hansen solubility parameter of the solvent B to water as expressed by the following equation (1) is 40 or more; and the solvent B is compatible with the solvent A, the polymer C is soluble in the solvent A but insoluble in the solvent B, and an average diameter d of the droplets applied in the step 2 is 0.01 μm or more and 50 μm or less, $$Ra = (4 \times \Delta D^2 + \Delta P^2 + \Delta H^2)^{0.5} \quad (1)$$

wherein, $\Delta D$ is a difference of dispersing component in the Hansen solubility parameter between a solvent and water, $\Delta P$ is a difference of polar component in the Hansen solubility parameter between a solvent and water, and $\Delta H$ is a difference of hydrogen-binding component in the Hansen solubility parameter between a solvent and water.

In the present invention, the wording "compatible" refers to a phenomenon in which in a mixed system containing the solvent A and the solvent B, the solvent A and the solvent B are mutually dissolved. The case where when the solvent A and the solvent B are mixed and allowed to stand, they are not separated in multiple phases, or the case where when the solvent A and the solvent B are mixed and subjected to a stirring operation, no phase separation is caused, so that they do not become cloudy, is judged such that the solvent A and the solvent B are in a compatibilized state with each other.

The polymer C is one which is soluble in the solvent A but insoluble in the solvent B and is dissolved in the liquid composition I.

In the present invention, the wording "the polymer C is soluble in the solvent A" means that the dissolved amount when the polymer C after drying at 105° C. for 2 hours and reaching a constant weight is dissolved in 100 g of the solvent A at 25° C. is 5 g or more. The aforementioned dissolve amount is preferably 10 g or more from the viewpoint of improving the whiteness and the concealment.

In the present invention, the wording "the polymer C is insoluble in the solvent B" means that the dissolved amount when the polymer C after drying at 105° C. for 2 hours and reaching a constant weight is dissolved in 100 g of the solvent B at 25° C. until it is saturated is less than 5 g. The foregoing dissolved amount is preferably 2 g or less from the viewpoint of improving the whiteness and the concealment.

The judgement regarding "compatible" or "soluble" is performed at 25° C.

In the present invention, the "Hansen solubility parameter" is expressed by dividing the solubility parameter (SP value) introduced by Hildebrand into three components (dispersing component D, polar component P, and hydrogen-binding component H). The D, P, and H of the respective solvents are described in detail in "HANSEN SOLUBILITY PARAMETERS" A User's Handbook Second Edition. In addition, the HSP values regarding a lot of solvents and resins are also described in Wesley L. Archer, "Industrial Solvents Handbook" and the like.

The D, P, and H of the respective solvents can also be determined using a software HSPiP of Charles Hansen Consulting, Inc. (Horsholm, Denmark, hansen-solubility-.com).

In the present invention, with respect to solvents registered in the database of HSPiP Version 4.1.03 (see the literatures of various HSP's), the values are adopted, and with respect to solvents not registered in the database, values estimated from the aforementioned HSPiP are adopted.

In accordance with the present invention, a coating film capable of exhibiting optical characteristics of a high whiteness and excellent concealment can be formed simply and precisely even without using an inorganic pigment. Although the reason for this is not elucidated yet, the following may be considered.

In the method for forming a coating film of the present invention, the liquid composition I containing the solvent A and the solvent B which are different from each other with respect to the boiling point and the distance Ra of the Hansen solubility parameter to water and the polymer C which is soluble in the solvent A but insoluble in the solvent B is used. After such liquid composition I is applied to the base material, droplets of the liquid II containing water are applied to the liquid composition I on the base material. In the present invention, the solubility parameters to water of the solvent A and the solvent B fall within the specified ranges, respectively, and therefore, the solvent B having been compatibilized with the solvent A causes phase separation due to the application of the liquid II. Then, it may be considered that since the polymer C is soluble in the solvent A but insoluble in the solvent B, the polymer C coats the phase-separated solvent B, and coalescence of the solvent B is suppressed, whereby primary particles having a core-shell structure in which the solvent B constitutes the core, and the polymer C constitutes the shell are formed. Furthermore, it may be considered that following the volatilization of the solvent A and the surface alignment of the formed primary particles, a cell-shaped convection structure regularly divided within the coating film, so-called "Benard cells", is generated, the primary particles are accumulated due to the Benard convection in each cell to form secondary particles, whereby the coating film according to the present invention is obtained. As a result, it may be conjectured that the light is scattered due to the particle structure formed within the coating film, the high whiteness is expressed, and the concealment is improved.

(Step 1)

The step 1 is a step of applying the liquid composition I containing the solvent A, the solvent B, and the polymer C to the base material.

<Liquid Composition I>

(Solvent A)

The liquid composition I according to the present invention contains the solvent A.

As for the solvent A, its boiling point is lower than 99° C., and the distance Ra of the Hansen solubility parameter of the solvent A to water as expressed by the aforementioned equation (1) is 36 or less. Furthermore, the solvent A is compatible with the solvent B and dissolves the polymer C therein. According to this, on the occasion when the droplets of the liquid II are applied to the liquid composition I, phase separation between the solvent A and the solvent B can be caused.

The boiling point of the solvent A is lower than 99° C., preferably 98° C. or lower, more preferably 90° C. or lower, and still more preferably 80° C. or lower from the viewpoint of forming the primary particles and improving the whiteness and the concealment, and is also preferably 50° C. or higher, more preferably 60° C. or higher, and still more preferably 70° C. or higher from the viewpoint of handling properties.

The distance Ra of the Hansen solubility parameter of the solvent A to water is 36 or less, preferably 32 or less, more preferably 30 or less, still more preferably 28 or less, and yet still more preferably 26 or less, and is also preferably 10 or more, more preferably 15 or more, still more preferably 20 or more, and yet still more preferably 22 or more, from the viewpoint of forming the primary particles and improving the whiteness and the concealment.

The solvent A may be used alone or in combination of two or more thereof. In the case of using the solvent A in combination of two or more thereof, the boiling point of the solvent A and the distance Ra of the Hansen solubility parameter of the solvent A to water can be determined as a weighted average value resulting through weighing in terms of the content (% by mass) of each of the solvents.

The solvent A is preferably a monohydric alcohol having 1 or more and 4 or less carbon atoms from the viewpoint of improving the whiteness and the concealment. Above all, more preferred is at least one selected from the group consisting of methanol, ethanol, propanol, isopropanol, and tert-butyl alcohol, and from the viewpoint of handling properties, still more preferred is at least one selected from the group consisting of ethanol, propanol, isopropanol, and tert-butyl alcohol, yet still more preferred is ethanol.

(Solvent B)

The liquid composition I according to the present invention contains the solvent B.

As for the solvent B, its boiling point is 150° C. or higher, and the distance Ra of the Hansen solubility parameter of the solvent B to water as expressed by the aforementioned equation (1) is 40 or more. Furthermore, the solvent B is compatible with the solvent A and does not dissolve the polymer C therein. According to this, on the occasion when the liquid II is applied to the surface of the liquid composition I, phase separation between the solvent A and the solvent B is caused, and the primary particles in which the solvent B is coated with the polymer C are formed.

The boiling point of the solvent B is 150° C. or higher, preferably 155° C. or higher, more preferably 160° C. or higher, still more preferably 165° C. or higher, and yet still more preferably 170° C. or higher from the viewpoint of forming the primary particles and improving the whiteness and the concealment, and is also preferably 300° C. or lower, more preferably 270° C. or lower, still more preferably 250° C. or lower, yet still more preferably 230° C. or lower, even yet still more preferably 210° C. or lower, and even still more preferably 180° C. or lower from the viewpoint of handling properties.

The distance Ra of the Hansen solubility parameter of the solvent B to water is 40 or more, preferably 42 or more, and more preferably 44 or more, and is also preferably 60 or less, more preferably 57 or less, and still more preferably 55 or less, from the viewpoint of forming the primary particles and improving the whiteness and the concealment.

The solvent B may be used alone or in combination of two or more thereof. In the case of using the solvent B in combination of two or more thereof, the boiling point of the solvent B and the distance Ra of the Hansen solubility parameter of the solvent B to water can be determined as a weighted average value resulting through weighing in terms of the content (% by mass) of each of the solvents.

From the viewpoint of improving the whiteness and the concealment, the solvent B preferably contains at least one selected from the group consisting of a hydrocarbon oil and a silicone oil.

Examples of the hydrocarbon oil include α-olefin oligomers, liquid paraffins, liquid isoparaffins, such as isododecane, isohexadecane and hydrogenated polyisobutene, heavy liquid isoparaffins, liquid ozokerite, squalane, pristane, and squalene. The hydrocarbon oil is preferably a liquid isoparaffin, and more preferably at least one selected from the group consisting of isododecane and hydrogenated polyisobutene.

A weight average molecular weight of the hydrocarbon oil is preferably 150 or more, and more preferably 160 or more, and is also preferably 1,000 or less, more preferably 500 or less, and still more preferably 300 or less.

A viscosity at 20° C. of the hydrogenated polyisobutene is preferably 0.5 mPa·s or more, more preferably 0.7 mPa·s or more, and still more preferably 1 mPa·s or more, and is also preferably 30 mPa·s or less, more preferably 25 mPa·s or less, and still more preferably 20 mPa·s or less. The viscosity at 20° C. of the hydrogenated polyisobutene can be measured with an E-type viscometer.

Examples of the silicone oil include linear silicone oils, such as trisiloxane; branched silicone oils, such as methyltrimethicone; and cyclic silicone oils, such as methylcyclopolysiloxane. Above all, preferred are trisiloxane and methyltrimethicone.

A weight average molecular weight of the silicone oil is preferably 150 or more, and more preferably 160 or more, and is also preferably 1,000 or less, more preferably 500 or less, and still more preferably 300 or less.

A viscosity at 25° C. of the silicone oil is preferably 0.5 mPa·s or more, and is also preferably 20 mPa·s or less, more preferably 10 mPa·s or less, still more preferably 5 mPa·s or less, and yet still more preferably 3 mPa·s or less. The viscosity at 25° C. of the silicone oil can be measured with an E-type viscometer.

The solvent B may also be one containing, in addition to the hydrocarbon oil or the silicone oil, an additive, such as a humectant, an ultraviolet absorber, a pest repellent, a wrinkling-preventing agent, a fragrance, and a dye.

In the case where the solvent B contains at least one selected from the group consisting of a hydrocarbon oil and a silicone oil each having a weight average molecular weight of 150 or more and 1,000 or less, the content of at least one selected from the group consisting of a hydrocarbon oil and a silicone oil each having a weight average molecular weight of 150 or more and 1,000 or less in the solvent B is preferably 50% by mass or more, more preferably 70% by mass or more, and still more preferably 90% by mass or more from the viewpoint of improving the whiteness and the concealment.

(Polymer C)

In the present invention, the polymer C coats the phase-separated solvent B and contributes to the formation of primary particles.

The polymer C is not particularly restricted so long as it is soluble in the solvent A but insoluble in the solvent B.

Examples of the polymer C include ionic polymers, such as an anionic polymer, a cationic polymer, and a betaine polymer; and nonionic polymers.

[Anionic Polymer]

The anionic polymer has an anionic group. Examples of the anionic group include groups that are capable of releasing a hydrogen ion upon dissociation thereof to exhibit acidity, such as a carboxy group (—COOM), a sulfonic acid group (—SO$_3$M), and a phosphoric acid group (—OPO$_3$M$_2$) or dissociated ion forms of these groups (such as —COO$^-$, —SO$_3^-$, —OPO$_3^{2-}$, and —OPO$_3^-$ M). In the aforementioned chemical formulae, M represents a hydrogen atom, an alkali metal, ammonium, or an organic ammonium.

The anionic polymer is preferably an anionic polymer CI containing a constitutional unit derived from a monomer having an acidic group (hereinafter also referred to as "anionic polymer CI").

The monomer having an acidic group is preferably a monomer having a carboxy group, more preferably at least one selected from the group consisting of (meth)acrylic acid, crotonic acid, itaconic acid, maleic acid, fumaric acid, citraconic acid, and 2-methacryloyloxymethyl succinic acid, and still more preferably (meth)acrylic acid.

Here, the term "(meth)acrylic acid" means at least one selected from the group consisting of acrylic acid and methacrylic acid.

The anionic polymer CI is preferably a copolymer further containing a constitutional unit derived from other monomer than the monomer having an acidic group. Examples of the other monomer include hydrophobic monomers, such as a (meth)acrylate having a hydrocarbon group derived from an aliphatic alcohol and an aromatic group-containing monomer; and nonionic monomers.

Here, the term "(meth)acrylate" means at least one selected from the group consisting of acrylates and methacrylates.

The (meth)acrylate having a hydrocarbon group derived from an aliphatic alcohol is one having a hydrocarbon group derived from an aliphatic alcohol having preferably 1 or more and 22 or less carbon atoms, more preferably 1 or more and 12 or less carbon atoms, and still more preferably 1 or more and 8 or less carbon atoms. Examples of the (meth) acrylate include a (meth)acrylate having a linear alkyl group, a (meth)acrylate having a branched alkyl group, and a (meth)acrylate having an alicyclic alkyl group.

The aromatic group-containing monomer is preferably a vinyl monomer having an aromatic group having 6 or more and 22 or less carbon atoms, which may have a substituent containing a hetero atom, and more preferably at least one selected from the group consisting of a styrene-based monomer and an aromatic group-containing (meth)acrylate. A molecular weight of the aromatic group-containing monomer is preferably less than 500.

Examples of the styrene-based monomer include styrene, α-methylstyrene, 2-methylstyrene, vinyltoluene, and divinylbenzene.

Examples of the aromatic group-containing (meth)acrylate include phenyl (meth)acrylate, benzyl (meth)acrylate, and phenoxyethyl (meth)acrylate.

Examples of the nonionic monomer in the anionic polymer CI include (meth)acrylamide; N-vinyl-2-pyrrolidone; diacetone acrylamide; an N-alkyl (meth)acrylamide; a hydroxyalkyl (meth)acrylate; a polyalkylene glycol (meth) acrylate (n=2 to 30, n represents an average addition molar number of the oxyalkylene group; hereinafter the same); an alkoxypolyalkylene glycol (meth)acrylate (n=1 to 30, and preferably 2 to 30); a phenoxy(ethylene glycol/propylene glycol copolymer) (n=1 to 30, in which n for ethylene glycol: n=1 to 29) (meth)acrylate.

Specific examples of commercially available nonionic monomers include NK ESTER M-20G, NK ESTER M-40G, NK ESTER M-90G, NK ESTER M-230G and the like, all of which are manufactured by Shin-Nakamura Chemical Co., Ltd.; and BLEMMER PE-90, BLEMMER PE-200, BLEMMER PE-350 and the like, BLEMMER PME-100, BLEMMER PME-200, BLEMMER PME-400 and the like, BLEMMER PP-500, BLEMMER PP-800, BLEMMER PP-1000 and the like, BLEMMER AP-150, BLEMMER AP-400, BLEMMER AP-550 and the like, BLEMMER 50PEP-300, BLEMMER 50POEP-800B, BLEMMER 43PAPE-600B and the like, all of which are manufactured by NOF Corporation.

Each of the aforementioned monomers can be used alone or in combination of two or more thereof.

A weight average molecular weight of the anionic polymer CI is preferably 5,000 or more, more preferably 10,000 or more, and still more preferably 20,000 or more, and is also preferably 1,000,000 or less, more preferably 500,000 or less, and still more preferably 200,000 or less. The weight average molecular weight of the anionic polymer CI is a molecular weight measured by the gel permeation chromatography (GPC) as expressed in terms of polystyrene.

Examples of commercially available products of the anionic polymer CI include acrylic acid/acrylic acid alkyl ester/(N-alkyl) acrylamide copolymers, such as ULTRAHOLD 8, ULTRAHOLD STRONG, and ULTRAHOLD POWER (all of which are manufactured by BASF Japan Ltd.), and AMPHOMER V-42 (manufactured by National Starch & Chemical Co.); carboxyvinyl polymers, such as CARBOPOL 980 and CARBOPOL 981 (all of which are manufactured by Lubrizol Advanced Materials, Inc.); (meth) acrylic acid/(meth)acrylic acid alkyl ester copolymers, such as DIAHOLD (manufactured by Mitsubishi Chemical Corporation); (acrylic acid/diacetone acrylamide) copolymer AMP or (acrylic acid/acrylic acid alkyl ester/diacetone acrylamide) copolymer AMP, such as PLASCIZE L-53P, PLASCIZE L-75CB, PLASCIZE L-9540B, PLASCIZE L-6466, and PLASCIZE L-3200B (all of which are manufactured by Goo Chemical Co., Ltd.); and (meth)acrylic acid/acrylic acid alkyl ester/polyvinylpyrrolidone copolymers, such as LUVIFLEX VBM35 (manufactured by BASF SE).

The anionic polymer CI is preferably a copolymer containing a constitutional unit derived from a monomer having an acidic group and a constitutional unit derived from a (meth)acrylic acid alkyl ester; more preferably a copolymer containing a constitutional unit derived from a monomer having an acidic group, a constitutional unit derived from a (meth)acrylic acid alkyl ester, and a constitutional unit derived from an (N-alkyl) (meth)acrylamide; still more preferably a (meth)acrylic acid/(meth)acrylic acid alkyl ester/(N-alkyl) (meth)acrylamide copolymer; and yet still more preferably an acrylic acid/acrylic acid alkyl ester/(N-alkyl) acrylamide copolymer.

[Cationic Polymer]

In the present invention, the wording "cationic" of the cationic polymer means that in the case where a non-neutralized polymer is dispersed or dissolved in pure water, the pH becomes larger than 7; in the case of a polymer having a quaternary ammonium group or the like, when it is dispersed or dissolved in pure water while making its counter ion as a hydroxide ion, the pH becomes larger than 7; or in the case where a polymer or the like is insoluble in pure water, and the pH cannot be distinctly measured, a zeta potential of the dispersion having the polymer or the like dispersed in pure water becomes positive.

The cationic polymer preferably has a basic group, such as a primary, secondary, or tertiary amino group, a quaternary ammonium group, and a hydrazino group, and more preferably has a quaternary ammonium group.

The basic group includes ones neutralized with an acid, such as hydrochloric acid, sulfuric acid, nitric acid, acetic acid, formic acid, maleic acid, fumaric acid, citric acid, tartaric acid, adipic acid, and lactic acid.

Examples of the cationic polymer include a natural cationic polymer and a synthetic cationic polymer.

The natural cationic polymer is a polymer obtained through an operation, such as extraction and purification, from a natural product or one resulting through chemical modification of the foregoing polymer, and examples thereof include ones having a glucose residue in the polymer skeleton. Specifically, examples thereof include cationized guar gum, cationized tara gum, cationized locust bean gum, cationized cellulose, a cationized hydroxyalkyl cellulose, and a cationic starch.

Examples of the synthetic cationic polymer include polyethyleneimine, polyallylamine or an acid-neutralized product thereof, a polyglycol-polyamine condensate, cationic polyvinyl alcohol, cationic polyvinylpyrrolidone, a cationic silicone polymer, a 2-(dimethylamino)ethyl methacrylate polymer or an acid-neutralized product thereof, poly(trimethyl-2-methacryloyloxyethylammonium chloride), an amine/epichlorohydrin copolymer, an N,N-dimethylaminoethyl methacrylic acid diethyl sulfate/vinylpyrrolidone copolymer, an N,N-dimethylaminoethyl methacrylic acid diethyl sulfate/N,N-dimethyl acrylamide/dimethacrylic acid polyethylene glycol copolymer, polydiallyldimethylammonium chloride, a diallyldimethylammonium chloride/acrylamide copolymer, a diallyldimethylammonium chloride/sulfur dioxide copolymer, a diallyldimethylammonium chloride/hydroxyethyl cellulose copolymer, a 1-allyl-3-methylimidazolium chloride/vinylpyrrolidone copolymer, an alkylamino (meth)acrylate/vinylpyrrolidone copolymer, an alkylamino (meth)acrylate/vinylpyrrolidone/vinyl caprolactam copolymer, a (3-(meth)acrylamidopropyl)trimethylammonium chloride/vinylpyrrolidone copolymer, and an alkylaminoalkyl acrylamide/alkyl acrylamide/(meth)acrylate/polyethylene glycol (meth)acrylate copolymer. These can be used alone or in combination of two or more thereof.

Above all, preferred are a cationic polymer CII-1 containing a constitutional unit derived from a monomer having a basic group (hereinafter also referred to as "cationic polymer CII-1") and a cationic silicone polymer CII-2.

[Cationic Polymer CII-1]

The cationic polymer CII-1 contains a constitutional unit derived from a monomer having a basic group. Examples of the foregoing basic group include the same groups as mentioned above.

Examples of the monomer having a basic group include amino group-containing monomers, such as an alkylamino (meth)acrylate, an N,N-dialkylaminoalkyl (meth)acrylate, N-[3-(dimethylamino)propyl](meth)acrylamide, and a diallyldialkylammonium, and acid-neutralized products or quaternized products thereof. These can be used alone or in combination of two or more thereof.

Examples of the acid for acid neutralization include hydrochloric acid, sulfuric acid, nitric acid, acetic acid, formic acid, maleic acid, fumaric acid, citric acid, tartaric acid, adipic acid, and lactic acid; and examples of the quaternizing agent include alkyl halides, such as methyl chloride, ethyl chloride, methyl bromide, and methyl iodide, and alkylating agents, such as dimethyl sulfate, diethyl sulfate, and di-n-propyl sulfate.

The cationic polymer CII-1 is preferably a homopolymer of a monomer having a basic group, a copolymer of a monomer having a basic group and other monomer than the foregoing monomer having a basic group, or a polycondensate; more preferably a copolymer of a monomer having a basic group and other monomer than the foregoing monomer having a basic group; still more preferably a copolymer containing a constitutional unit derived from a monomer having a basic group, a constitutional unit derived from the hydrophobic group as exemplified above for the anionic polymer CI, and a constitutional unit derived from the nonionic monomer as exemplified above for the anionic polymer CI; and yet still more preferably a copolymer containing a constitutional unit derived from an amino group-containing monomer, a constitutional unit derived from a (meth)acrylic acid alkyl ester, a constitutional unit derived from an N-alkyl (meth)acrylamide, and a constitutional unit derived from an alkoxy polyethylene glycol mono(meth)acrylate. The cationic polymer CII-1 is produced by copolymerizing raw material monomers containing these monomers by a known polymerization method, such as a block polymerization method, a solution polymerization method, a suspension polymerization method, and an emulsion polymerization method. Of these polymerization methods, a solution polymerization method is preferred.

From the viewpoint of improving the whiteness and the concealment, at the time of producing the cationic polymer CII-1, the content of the monomer having a basic group, the hydrophobic monomer, and the nonionic monomer in the raw material monomers (the content as the non-neutralized content, hereafter the same), namely, the content of the constitutional unit derived from each of the components in the cationic polymer CII-1 is as follows.

The content of the monomer having a basic group is preferably 3% by mass, more preferably 5% by mass or more, and still more preferably 7% by mass or more, and is also preferably 35% by mass or less, more preferably 30% by mass or less, still more preferably 25% by mass or less, and yet still more preferably 20% by mass or less.

The content of the hydrophobic monomer is preferably 5% by mass or more, more preferably 10% by mass or more, and still more preferably 15% by mass or more, and is also preferably 35% by mass or less, more preferably 30% by mass or less, and still more preferably 25% by mass or less.

The content of the nonionic monomer is preferably 30% by mass or more, more preferably 40% by mass or more, and still more preferably 50% by mass or more, and is also preferably 85% by mass or less, more preferably 80% by mass or less, and still more preferably 75% by mass or less.

A weight average molecular weight of the cationic polymer CII-1 is preferably 5,000 or more, more preferably 7,000 or more, still more preferably 10,000 or more, yet still more preferably 50,000 or more, and even yet still more preferably 100,000 or more, and is also preferably 1,000,000 or less, more preferably 500,000 or less, still more preferably 300,000 or less, and yet still more preferably 200,000 or less, from the viewpoint of improving the whiteness and the concealment. The weight average molecular weight of the cationic polymer CII-1 can be measured by the method described in the section of Examples.

[Cationic Silicone Polymer CII-2]

The cationic silicone polymer CII-2 is preferably a poly (N-acylalkyleneimine)/organopolysiloxane copolymer containing an organopolysiloxane segment (x) (hereinafter also referred to simply as "segment (x)") and a poly(N-acylalkyleneimine) segment (y) composed of an alkylene group containing a cationic nitrogen atom binding to at least one silicon atom of the segment (x) and a repeating unit of an N-acylalkyleneimine represented by following general formula (1-1) (the poly(N-acylalkyleneimine) segment (y) will be hereinafter also referred to simply as "segment (y)").

(1-1)

In the formula, $R^1$ represents a hydrogen atom, an alkyl group having 1 or more and 22 or less carbon atoms, an aryl group having 6 or more and 22 or less carbon atoms, or an arylalkyl group or alkylaryl group having 7 or more and 22 or less carbon atoms; and a is 2 or 3.

The alkyl group represented by $R^1$ is preferably an alkyl group having 1 or more and 12 or less carbon atoms, and more preferably an alkyl group having 1 or more and 3 or less carbon atoms, such as a methyl group, an ethyl group, a n-propyl group, and an isopropyl group.

Examples of the aryl group represented by $R^1$ include a phenyl group and a naphthyl group.

Examples of the arylalkyl group represented by $R^1$ include a phenylalkyl group and a naphthylalkyl group, in which the carbon number of the alkyl group is 1 or more and 20 or less; and examples of the alkylaryl group include an alkylphenyl group and an alkylnaphthyl group, in which the carbon number of the alkyl group is 1 or more and 20 or less.

Although a degree of polymerization of the repeating unit represented by the general formula (1-1) in the segment (y), for example, it is preferably 1 or more and 500 or less, and more preferably 6 or more and 100 or less.

Examples of the organopolysiloxane that forms the segment (x) include compounds represented by the following general (1-2).

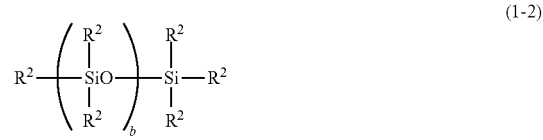

(1-2)

In the formula, $R^2$ represents an alkyl group having 1 or more and 22 or less carbon atoms, a phenyl group, or an alkyl group containing a nitrogen atom; though a plurality of the $R^2$ groups may be the same as or different from each other, at least one of them is an alkyl group containing a cationic nitrogen atom; and b is 100 or more and 5,000 or less.

In the general formula (1-2), among the alkyl groups having 1 or more and 22 or less carbon atoms as represented by $R^2$, an alkyl group having 1 or more and 12 or less carbon atoms is preferred, an alkyl group having 1 or more and 3 or less carbon atoms is more preferred, and a methyl group is still more preferred.

Examples of the alkyl group containing a nitrogen atom as represented by $R^2$ include alkyl groups having 2 or more and 20 or less carbon atoms which contains preferably 1 or more and 3 or less nitrogen atoms. The alkyl group containing a nitrogen atom may be existent in at least one silicon atom at an end or in a side chain of the organopolysiloxane, and the number of alkyl groups containing a nitrogen atom in the organopolysiloxane is preferably 1 or more and 300 or less, and more preferably 1 or more and 100 or less.

In the general formula (1-2), b is preferably 100 or more and 2,000 or less, and more preferably 350 or more and 1,500 or less.

A weight average molecular weight of the organopolysiloxane that forms the segment (x) is preferably 1,000 or more, more preferably 10,000 or more, and still more preferably 30,000 or more, and is also preferably 1,000,000 or less, more preferably 500,000 or less, and still more preferably 200,000 or less.

Examples of the alkylene group containing a nitrogen atom intervening in the bonding between the segment (x) and the segment (y) include alkylene groups having 2 or more and 20 or less carbon atoms which contains preferably 1 or more and 3 or less nitrogen atoms.

Specifically, examples of the nitrogen atom existing between carbon and carbon of the alkylene chain or at an end of the alkylene chain include (i) a secondary amine or a tertiary amine, (ii) an ammonium salt in which a hydrogen ion is added to a secondary amine or a tertiary amine, and (iii) a quaternary amine salt.

The poly(N-acylalkyleneimine)/organopolysiloxane copolymer is preferably one in which the segment (y) is bound to at least one silicon atom at an end or in a side chain of the segment (x) via the alkylene group containing a cationic nitrogen atom.

A mass ratio of the content of the segment (x) to the total content of the segment (x) and the segment (y) [{content of segment (x)}/{total content of segment (x) and segment (y)}] in the poly(N-acylalkyleneimine)/organopolysiloxane copolymer is preferably 0.1 or more, more preferably 0.3 or more, still more preferably 0.4 or more, and yet still more preferably 0.5 or more, and is also preferably 0.99 or less, more preferably 0.95 or less, and still more preferably 0.9 or less, from the viewpoint of improving the whiteness and the concealment.

In this specification, the mass ratio [{content of segment (x)}/{total content of segment (x) and segment (y)}] is a ratio of a mass (Mx) of the segment (x) to the total amount of a mass (Mx) of the segment (x) and a mass (My) of the segment (y) in the poly(N-acylalkyleneimine)/organopolysiloxane copolymer.

The mass ratio [{content of segment (x)}/{total content of segment (x) and segment (y)}] can be determined by dissolving 5% by mass of the poly(N-acylalkyleneimine)/organopolysiloxane copolymer in deuterated chloroform and calculating an integration ratio of an alkyl group or a phenyl group in the segment (x) and a methylene group in the segment (y) through a nuclear magnetic resonance ($^1$H-NMR) analysis.

A weight average molecular weight of the poly(N-acylalkyleneimine)/organopolysiloxane copolymer is preferably 10,000 or more, more preferably 50,000 or more, and still more preferably 70,000 or more, and is also preferably 1,000,000 or less, more preferably 500,000 or less, and still more preferably 200,000 or less, from the viewpoint of improving the whiteness and the concealment. The weight average molecular weight of the poly(N-acylalkyleneimine)/organopolysiloxane copolymer can be calculated from the weight average molecular weight of the organopolysiloxane that forms the segment (x) and the aforementioned mass ratio [{content of segment (x)}/{total content of segment (x) and segment (y)}].

Suitable examples of the poly(N-acylalkyleneimine)/organopolysiloxane copolymer include a poly(N-formylethyleneimine)/organopolysiloxane copolymer, a poly(N-acetylethyleneimine)/organopolysiloxane copolymer, and a poly(N-propionylethyleneimine)/organopolysiloxane copolymer.

The poly(N-acylalkyleneimine)/organopolysiloxane copolymer can be, for example, obtained by a method of allowing the (N-acylalkyleneimine) that is a ring-opening polymer of a cyclic imino ether and the organopolysiloxane that forms the segment (x) to react with each other. More specifically, the poly(N-acylalkyleneimine)/organopolysiloxane copolymer can be, for example, obtained by the method described in JP 2011-126978 A. The poly(N-acylalkyleneimine)/organopolysiloxane copolymer to be used as the cationic silicone polymer CII-2 can be used alone or in combination of two or more thereof.

[Betaine Polymer]

In the present invention, examples of the betaine polymer include a copolymer of a monomer having an anionic group and a monomer having a cationic group, a polymer or copolymer of a betaine monomer, a polymer having an anionic group introduced into a cationic polymer, and a polymer having the aforementioned basic group introduced into an anionic polymer. Above all, preferred is a polymer containing a betaine structure in a side chain thereof, and more preferred is a betaine polymer CIII containing a constitutional unit derived from a betaine monomer (hereinafter also referred to as "betaine polymer CIII").

The betaine monomer is preferably a monomer containing a betaine structure and a (meth)acrylamide structure, more preferably at least one selected from the group consisting of a carboxybetaine monomer, a sulfobetaine monomer, and a phosphobetaine monomer, and still more preferably a carboxybetaine monomer.

Examples of the betaine polymer include polymethacryloylethyl dimethylbetaine, an N-methacryloyloxyethyl-N,N-dimethylammonium-α-N-methylcarboxybetaine/methacrylic acid alkyl ester copolymer, a methacryloylethyldimethylbetaine/methacryloylethyltrimethylammonium chloride/2-hydroxyethyl methacrylate copolymer, a methacryloylethyldimethylbetaine/ methacryloyethyltrimethylammonium chloride/methacrylic acid/methoxypolyethylene glycol copolymer, and an octylacrylamide/acrylate/butylaminoethyl methacrylate copolymer. Above all, an N-methacryloyloxyethyl-N,N-dimethylammonium-α-N-methylcarboxybetaine/met hacrylic acid alkyl ester copolymer is preferred.

A weight average molecular weight of the betaine polymer is preferably 5,000 or more, and more preferably 10,000 or more, and is also preferably 1,000,000 or less, more preferably 500,000 or less, and still more preferably 300,000 or less, from the viewpoint of improving the concealment and the makeup durability. The weight average molecular weight of the betaine polymer is a molecular weight measured by the gel permeation chromatography (GPC) as expressed in terms of polystyrene.

Examples of commercially available betaine polymers include PLASCIZE L-410W, PLASCIZE L-402W, PLASCIZE L-440, PLASCIZE L-440W, PLASCIZE K-450, and PLASCIZE L-450W (all of which are a trade name, manufactured by Goo Chemical Co., Ltd.); YUKA FORMER SM and YUKA FORMER 301 (all of which are a trade name, manufactured by Mitsubishi Chemical Corporation); RAM RESIN-1000, RAM RESIN-2000, RAM RESIN-3000, and RAM RESIN-4000 (all of which are a trade name, manufactured by Osaka Organic Chemical Industry Ltd.); MERQUAT PLUS 3330 (a trade name, manufactured by Lubrizol Japan Ltd.); and UNFOAMER 28-4910 and UNFOAMER LV-71 (all of which are a trade name, manufactured by Akzo Nobel N.V.).

[Nonionic Polymer]

Examples of the nonionic polymer include polymers having a constitutional unit derived from a nonionic monomer; and water-soluble polysaccharides (such as a cellulose-based polymer, a gum-based polymer, and a starch-based polymer) and derivatives thereof.

Examples of the nonionic monomer in the nonionic polymer include (meth)acrylates having a hydrocarbon group derived from an aliphatic alcohol having 1 or more and 22 or less carbon atoms; N-vinyl-2-pyrrolidone; vinyl alcohol; polyalkylene glycol (meth)acrylates (n=1 to 30); alkoxypolyalkylene glycol mono(meth)acrylates (n=1 to 30); and (meth)acrylamides and derivatives thereof.

The nonionic polymer may further contain a constitutional unit derived from other monomer than the nonionic monomer. Examples of the other monomer include styrene-based monomers, such as styrene; aromatic group-containing (meth)acrylates, such as benzyl (meth)acrylate; and vinyl acetate.

Specifically, examples of the nonionic polymer include polyvinyl alcohol, polyvinyl acetal, polyurethanepolyurea, polyvinylpyrrolidone, copolymers of vinylpyrrolidone and other nonionic monomer, such as a vinylpyrrolidone/vinyl acetate copolymer, cellulose-based polymers, such as a hydroxyalkyl cellulose, polyethylene glycol, polypropylene glycol, polyglycerin, pullulan, guar gum, poly(N,N-dimethylacrylamide), poly(N-vinylacetamide), poly(N-vinylformamide), and a poly(2-alkyl-2-oxazoline). Above all, polyvinyl acetal and polyurethanepolyurea are preferred.

Examples of commercially available nonionic polymers include polyvinyl butyral, such as S-LEC B Series (which are a trade name, manufactured by Sekisui Chemical Co., Ltd.); polyurethanepolyurea, such as BAYCUSAN Series (which are a trade name, manufactured by Covestro Japan Ltd.); hydroxyethyl cellulose, such as HEC DAICEL SE900, HEC DAICEL SE850, HEC DAICEL SE600, HEC DAICEL SE550, and HEC DAICEL SE400 (all of which are a trade name, manufactured by Daicel FineChem Ltd.); highly polymerized polyethylene glycol, such as POLYOX WSR N-12, POLYOX WSR N-60K, and POLYOX WSR 301 (all of which are a trade name, manufactured by The Dow Chemical Company); PEO-27, PEO-18, PEO-15, and PEO-8 (all of which are a trade name of polyethylene oxide, manufactured by Sumitomo Seika Chemicals Co., Ltd.); polyvinylpyrrolidone, such as LUVISKOL K90, LUVISKOL K80, and LUVISKOL K30 (all of which are a trade name, manufactured by BSAF SE); and polyvinyl alcohol, such as GOHSENOL Series (which are a trade name, manufactured by The Nippon Synthetic Chemical Industry Co., Ltd.).

In the present invention, from the viewpoint of improving the whiteness and the concealment, the dissolved amount of the polymer C in water is preferably less than 5 g in terms of the dissolved amount when the polymer C after drying at 105° C. for 2 hours and reaching a constant weight is dissolved in 100 g of water at 25° C. until it is saturated.

In the case where the polymer C is an anionic polymer, the aforementioned dissolved amount is the dissolved amount when the anionic group of the polymer C is neutralized with sodium hydroxide to an extent of 100%. In the case where the polymer C is a cationic polymer, the aforementioned dissolved amount is the dissolved amount when the cationic group of the polymer C is neutralized with hydrochloric acid to an extent of 100%.

In the present invention, from the viewpoint of improving the whiteness and the concealment, the polymer C is preferably an amphipathic polymer which is insoluble in the solvent B but has affinity to the solvent B and which also has affinity to water; and more preferably an ionic polymer. It is still more preferred that the polymer C contains a polymer containing, as the monomer constitutional unit, at least one selected from the group consisting of a monomer having an acidic group, a monomer having a basic group, and a betaine monomer; and it is yet still more preferred that the polymer C contains at least one selected from the group consisting of the anionic polymer CI, the cationic polymer CII-1, the cationic silicone polymer CII-2, and the betaine polymer CIII.

Above all, the polymer C is preferably a combination of two or more polymers; more preferably one containing the anionic polymer CI and at least one selected from the group consisting of the cationic polymer CII-1, the cationic silicone polymer CII-2, and the betaine polymer CIII; still more preferably one containing the anionic polymer CI and at least one selected from the group consisting of the cationic polymer CII-1 and the betaine polymer CIII; yet still more preferably one containing the anionic polymer CI and the cationic polymer CII-1 or the betaine polymer CIII; and even yet still more preferably one containing the anionic polymer CI and the betaine polymer CIII.

A viscosity at 20° C. of the liquid composition I is preferably 1 mPa·s or more, more preferably 5 mPa·s or more, and still more preferably 10 mPa·s or more, and is also preferably 1,000 mPa·s or less, more preferably 700 mPa·s or less, still more preferably 300 mPa·s or less, yet still more preferably 100 mPa·s or less, even yet still more preferably 50 mPa·s or less, and even still more preferably 30 mPa·s or less. The viscosity at 20° C. of the liquid composition I is measured by the method described in the section of Examples.

(pH Control Agent)

It is preferred that the liquid composition I further contains a pH control agent. It may be considered that when the pH control agent changes the pH of the liquid composition I, the diameter or refractive index of the formed primary particles is changed, whereby the whiteness and the concealment can be improved. From the foregoing viewpoint, the pH (at 20° C.) of the liquid composition I is preferably 4 or more, more preferably 5 or more, and still more preferably 6 or more, and is also preferably 8 or less, more preferably 7.5 or less, and still more preferably 7 or less, from the viewpoint of improving the whiteness and the concealment. The pH (at 20° C.) of the liquid composition I is measured by the method described in the section of Examples.

Examples of the pH control agent include organic acids having a phosphoric acid group, a phosphonic acid group, a phosphinic acid group, a sulfuric acid group, a sulfo group, a sulfinic acid group, or a carboxy group, and salts thereof. Of these, organic acids having a carboxy group are preferred from the viewpoint of improving the whiteness and the concealment. Examples of the organic acid having a carboxy group include organic acids, such as hydroxycarboxylic acids, e.g., lactic acid, tartaric acid, malic acid, and citric acid; monocarboxylic acids, e.g., acetic acid; and saturated or unsaturated dicarboxylic acids, e.g., succinic acid, fumaric acid, and maleic acid; and salts thereof. Of these, more preferred is at least one selected from the group consisting of a hydroxycarboxylic acid and a dicarboxylic acid; still more preferred is a hydroxycarboxylic acid; and yet still more preferred is lactic acid.

The liquid composition I according to the present invention may further contain, as an arbitrary component, a component, such as a dye, an inorganic pigment, an organic pigment, an ultraviolet scattering agent, an ultraviolet absorber, a fragrance, a beauty ingredient, a medicinal ingredient, a humectant, an antioxidant, a disinfectant, and an antiseptic agent. Each of them may be used alone or in combination of two or more.

(Production of Liquid Composition I)

The liquid composition I can be obtained by mixing the solvent A, the solvent B, and the polymer C, and optionally, the aforementioned arbitrary component, followed by stirring. Although the mixing order is not particularly restricted, it is preferably to include a step of first mixing the solvent A and the polymer C to dissolve the polymer C in the solvent A, thereby obtaining a solution of the polymer C, and then adding the solvent B to the foregoing solution. If desired, the aforementioned arbitrary component may be further added and mixed.

From the viewpoint of improving the whiteness and the concealment, the content of each of the components in the liquid composition I is as follows.

The content of the solvent A in the liquid composition I is preferably 50% by mass or more, more preferably 60% by mass or more, and still more preferably 70% by mass or more, and is also preferably 90% by mass or less, more preferably 87% by mass or less, and still more preferably 85% by mass or less.

The content of the solvent B in the liquid composition I is preferably 5% by mass or more, more preferably 7% by mass or more, and still more preferably 10% by mass or more, and is also preferably 40% by mass or less, more preferably 30% by mass or less, and still more preferably 25% by mass or less.

A mass ratio of the content of the solvent A to the solvent B in the liquid composition I [(solvent A)/(solvent B)] is preferably 0.01 or more, more preferably 0.1 or more, still more preferably 0.5 or more, yet still more preferably 1 or more, even yet still more preferably 1.5 or more, and even still more preferably 2 or more, and is also preferably 50 or less, more preferably 30 or less, still more preferably 10 or less, yet still more preferably 7 or less, and even yet still more preferably 5 or less.

The content of the polymer C in the liquid composition I is preferably 2% or more, more preferably 3% by mass or more, and still more preferably 4% by mass or more, and is also preferably 15% by mass or less, more preferably 10% by mass or less, and still more preferably 8% by mass or less.

In the case where the polymer C contains the anionic polymer CI and at least one selected from the group consisting of the cationic polymer CII-1, the cationic silicone polymer CII-2, and the betaine polymer CIII, the total content of the anionic polymer CI and at least one selected from the group consisting of the cationic polymer CII-1, the cationic silicone polymer CII-2, and the betaine polymer CIII in the polymer C, or the total content of the anionic polymer CI, the cationic polymer CII-1, the cationic silicone polymer CII-2, and the betaine polymer CIII in the polymer C is preferably 60% by mass or more, more preferably 70% by mass or more, still more preferably 80% by mass or more, and yet still more preferably 90% by mass or more, and is also preferably 100% by mass or less, and yet still more preferably 100% by mass.

In the case where the polymer C contains the anionic polymer CI and the betaine polymer CIII, a mass ratio of content between the anionic polymer CI and the betaine polymer CIII [(content of anionic polymer CI)/(content of betaine polymer CIII)] is preferably 0.1 or more, more preferably 0.3 or more, still more preferably 0.5 or more, and yet still more preferably 0.7 or more, and is also preferably 9 or less, more preferably 5 or less, still more preferably 3 or less, and yet still more preferably 2 or less.

A mass ratio of the content of the polymer C to the total content of the solvent A and the solvent B in the liquid composition I [(polymer C)/{(solvent A)+(solvent B)}] is preferably 0.01 or more, more preferably 0.03 or more, and still more preferably 0.05 or more, and is also preferably 1 or less, more preferably 0.5 or less, still more preferably 0.3 or less, yet still more preferably 0.2 or less, and even yet still more preferably 0.1 or less.

The content of the inorganic pigment in the liquid composition I is preferably 10% by mass or less, more preferably 5% by mass or less, still more preferably 3% by mass or less, yet still more preferably 1% by mass or less, and even yet still more preferably 0% by mass.

The content of the pH control agent in the liquid composition I is preferably 0.01% by mass or more, more preferably 0.1% by mass or more, and still more preferably 0.2% by mass or more, and is also preferably 1% by mass or less, more preferably 0.7% by mass or less, and still more preferably 0.5% by mass or less.

<Base Material>

Examples of the base material to be used in the present invention include metals; inorganic materials, such as a glass and a silicon wafer; organic materials, such as leather and a resin film, e.g., a polyester film, a polyvinyl chloride film, a polypropylene film, a polyethylene film, and a nylon film; and composite materials thereof. That is, the base material in the present invention is a material other than organs of human being and animals, such as a skin, a hair, and a nail, and appendages thereof, and artifacts thereof.

The thickness of the base material can be appropriately selected according to the kind of the base material.

Although a method for applying the liquid composition I to the base material in the step 1 is not particularly limited, examples thereof include an inkjet method, a gravure method, a flexographic method, a bar coating method, a screen method, a roll coater coating method, a spraying method, a spin coating method, and a dip method.

An applied amount of the liquid composition I to the base material is preferably 0.5 mg/cm$^2$ or more, more preferably 1 mg/cm$^2$ or more, and still more preferably 3 mg/cm$^2$ or more, and is also preferably 10 mg/cm$^2$ or less, more preferably 8 mg/cm$^2$ or less, and still more preferably 6 mg/cm$^2$ or less.

A film thickness before drying of the liquid composition I to be applied onto the base material, namely a wet film thickness T is preferably 5 μm or more, more preferably 10 μm or more, and still more preferably 30 μm or more, and is also preferably 300 μm or less, more preferably 200 μm or less, and still more preferably 100 μm or less.

From the viewpoint of simplicity of operations, the application of the liquid composition I to the base material in the step 1 is preferably performed in an air atmosphere.

A temperature on the occasion of applying the liquid composition I in the step 1 is preferably 15° C. or higher, more preferably 18° C. or higher, and still more preferably 20° C. or higher, and is also preferably 35° C. or lower, more preferably 30° C. or lower, and still more preferably 28° C. or lower.

A relative humidity on the occasion of applying the liquid composition I in the step 1 is preferably 5% or more, more preferably 10% or more, and still more preferably 30% or more, and is also preferably 85% or less, more preferably 70% or less, and still more preferably 60% or less.

(Step 2)

The step 2 is a step of applying droplets of a liquid II containing water to the liquid composition I on the base material as applied in the step 1.

According to this, the phase separation between the solvent A and the solvent B quickly proceeds, and the solvent B is coated with the polymer C, whereby the primary particles are formed. As for the application of the droplets in the step 2, the droplets may be applied to the whole of an area to which the liquid composition I has been applied in the step 1, or may be applied to a part of the foregoing area.

Although an interval of time between the step 1 and the step 2 is not particularly restricted so far as the step 2 is performed before the liquid composition I on the base material is dried, it is preferably 0.01 seconds or more, and more preferably 0.1 seconds or more, and from the viewpoint of whiteness and concealment, is also preferably 10 seconds or less, and more preferably 5 seconds or less.

<Liquid II>

The liquid II according to the present invention contains water, but it may also contain other liquid than water.

As for the other liquid, a monohydric alcohol having 1 or more and 4 or less carbon atoms is preferred, and example thereof include methanol, ethanol, propanol, isopropanol, and tert-butyl alcohol. Above all, from the viewpoint of improving the whiteness and the concealment, preferred is at least one selected from the group consisting of ethanol, propanol, isopropanol, and tert-butyl alcohol, more preferred is ethanol.

A content of water in the liquid II is preferably 50% by mass or more, more preferably 70% by mass or more, and still more preferably 90% by mass or more, and is also preferably 100% by mass or less, and yet still more preferably 100% by mass.

As for the method for applying the liquid II, it is preferred that the droplets of the liquid II are generated and then applied. Examples of the method for generating the droplets include a piezo type, a thermal type, a pressure type, a rotation type, a steam type, an ultrasonic wave type, and an electrostatic type. Above all, from the viewpoint of forming fine primary particles and improving the whiteness and the concealment, preferred is a method for generating the droplets having a speed at the time of generation, such as a piezo type, a thermal type, a pressure type, a rotation type, and a steam type.

In the case where the droplets have a speed, an energy $E_1$ per droplet (hereinafter also referred to as "energy $E_1$") is expressed by the following equation (2) that is a sum of a motion energy $E_{M1}$ and a surface free energy $E_{S1}$.

$$E_1=[(\pi/12)\rho d^3 V^2+\pi d^2 \gamma_{II}] \quad (2)$$

Here, $\rho$ is a density (g/cm$^3$) of the liquid II; d is an average diameter (μm) of the droplets; V is an average speed (m/s) of the droplets; and $\gamma_{II}$ is a surface tension (mJ/m$^2$) of the liquid II.

When the droplets of the liquid II are applied to the liquid composition I on the base material, there may be considered the case where the liquid II impacts in a hemispherical shape on the liquid composition I; and the case where the liquid II is buried in a spherical shape in the liquid composition I. In all of these cases, though a part of the energy $E_1$ to be brought by the droplets is consumed owing to the formation of the droplets of the liquid II in the liquid composition I, it may be considered that the remainder is consumed as a surplus energy for the formation of a new interface of the solvent B to be phase-separated, and the solvent B is coated with the polymer C, whereby the primary particles are formed. For that reason, it may be considered that if the energy $E_1$ of the droplets is adjusted, the particle diameter of the formed primary particles can be adjusted, and the whiteness of the coating film can be controlled.

Here, a relation between the energy $E_1$ of the droplets and the particle diameter of the formed primary particles is described by reference to the case where the liquid II is water, the solvent A is ethanol, and the solvent B is a liquid paraffin as a representative example.

In the case where 1 pL of a waterdrop has a droplet speed of 7.5 m/s, the motion energy $E_{M1}$ is $2.81\times10^{-8}$ mJ, the surface free energy $E_{S1}$ is $3.51\times10^{-8}$ mJ, and the energy $E_1$ of 1 pL of the waterdrop is calculated to be $6.32\times10^{-8}$ mJ. In the case where the liquid II impacts in a hemispherical shape on the liquid composition I, on the assumption that a hemispherical surface-shaped interface between air and water and a circular interface between ethanol and water are formed, and these interfaces are replaced by an interface in which a mass ratio (ethanol/water) is 50/50, the surplus energy becomes $5.13\times10^{-8}$ mJ. Then, this surplus energy is consumed for the formation of a new interface of the liquid paraffin in the waterdrop expressed due to phase separation. Since the underwater surface tension of the liquid paraffin is 45 mJ/m$^2$, a required area of the interface of the liquid paraffin to be newly formed in the waterdrop is calculated to be $1.14\times10^{-9}$ m$^2$.

Since the liquid paraffin in the droplet independently exists in a spherical shape without be coalesced due to the polymer C, and a maximum filling rate of the liquid paraffin spheres in the droplets is 36.3%, in order to consume the aforementioned surplus energy, it can be calculated such that an average particle diameter of the particles formed in the waterdrops must be at least less than 2 μm.

In the case where the liquid II is buried in a spherical shape in the liquid composition I, on the assumption that the liquid II becomes 1 pL of a waterdrop as it is in ethanol, and the interface between the waterdrop and ethanol is replaced by an interface in which a mass ratio (ethanol/water) is 50/50, the surplus energy becomes $4.93\times10^{-8}$ mJ. Similar to the former case, since the underwater surface tension of the liquid paraffin is 45 mJ/m$^2$, a required area of the interface of the liquid paraffin to be newly formed in the waterdrop is calculated to be $1.10\times10^{-9}$ m$^2$.

Furthermore, similar to the former case, since the liquid paraffin in the droplet independently exists in a spherical shape, and a maximum filling rate of the liquid paraffin spheres in the droplets is 36.3%, in order to consume the aforementioned surplus energy, it can be calculated such that an average particle diameter of the particles formed in the waterdrops must be at least less than 2 μm.

In the light of the above, it may be considered that the energy $E_1$ per droplet is closely related to the particle diameter of the formed primary particles. Then, it may be considered that by controlling a total energy E of the applied droplets by an average diameter d of the droplets, an average speed V of the droplets, a surface tension $\gamma_{II}$ of the liquid II, and an impact density p of the droplets to adjust the particle diameter of the formed primary particles, the whiteness can be controlled, and a coating film capable of exhibiting optical characteristics simply and precisely can be obtained.

The total energy E of the droplets (the sum of a motion energy $E_M$ and a surface free energy $E_S$) is expressed by the product of the energy $E_1$ per droplet and the impact density p (dot/m$^2$) of the droplets, it is preferably 8.0 mJ/m$^2$ or more, more preferably 20 mJ/m$^2$ or more, and still more preferably 100 mJ/m$^2$ or more, and is also preferably 4,000 mJ/m$^2$ or less, more preferably 3,000 mJ/m$^2$ or less, and still more preferably 2,600 mJ/m$^2$ or less, from the viewpoint of controlling the whiteness.

The average diameter d of the droplets of the liquid II is 0.01 μm or more, preferably 0.1 μm or more, more preferably 0.5 μm or more, and still more preferably 1 μm or more, and is also 50 μm or less, preferably 40 μm or less, more preferably 30 μm or less, and still more preferably 20 μm or less, from the viewpoint of improving the whiteness and the concealment.

A ratio (d/T) of the average diameter d of the droplets applied in the step 2 to the wet film thickness T of the liquid composition I applied in the step 1 is preferably less than 5, more preferably less than 3, and still more preferably less than 1, and is also preferably 0.1 or more, more preferably 0.2 or more, and still more preferably 0.3 or more, from the viewpoint of improving the whiteness and the concealment.

An applied amount of the droplets of the liquid II is preferably 0.01 mg/cm$^2$ or more, more preferably 0.05 mg/cm$^2$ or more, and still more preferably 0.1 mg/cm$^2$ or more, and is also preferably 10 mg/cm$^2$ or less, more preferably 7 mg/cm$^2$ or less, and still more preferably 5 mg/cm$^2$ or less.

An average speed of the droplets is preferably 1 m/s or more, more preferably 1.5 m/s or more, and still more preferably 2 m/s or more, and is also preferably 20 m/s or less, more preferably 18 m/s or less, and still more preferably 15 m/s or less.

A surface tension $\gamma_I$ of the liquid composition I is preferably 15 mN/m or more, more preferably 18 mN/m or more, and still more preferably 20 mN/m or more, and is also preferably 35 mN/m or less, more preferably 30 mN/m or less, and still more preferably 27 mN/m or less.

A surface tension $\gamma_{II}$ of the liquid II is preferably 25 mN/m or more, more preferably 30 mN/m or more, and still more preferably 35 mN/m or more, and is also preferably 80 mN/m or less, more preferably 75 mN/m or less.

A difference between the surface tension $\gamma_I$ of the liquid composition I and the surface tension $\gamma_{II}$ of the liquid II ($\gamma_I$-$\gamma_{II}$) is preferably 1 mN/m or more, more preferably 3 mN/m or more, and still more preferably 5 mN/m or more, and is also preferably 55 mN/m or less, more preferably 53 mN/m or less, and still more preferably 50 mN/m or less.

The surface tension is measured by the method described in the section of Examples.

Although a temperature on the occasion of applying the droplets in the step 2 is not particularly restricted, it is preferably 15° C. or higher, more preferably 18° C. or higher, and still more preferably 20° C. or higher, and is also preferably 35° C. or lower, more preferably 30° C. or lower, and still more preferably 28° C. or lower.

A relative humidity on the occasion of applying the droplets in the step 2 is preferably 5% or more, more preferably 10% or more, and still more preferably 30% or more, and is also preferably 85% or less, more preferably 70% or less, and still more preferably 60% or less.

As for a method for applying the droplets in the step 2, an inkjet method is preferred. By adopting the inkjet method, the particle diameter and the speed of the droplets ejected from an inkjet head are precisely controlled, whereby the particle diameter of the formed primary particles can be adjusted, and the whiteness can be improved.

In the case of performing the application of the droplets in the step 2 by the inkjet method, by installing the liquid II in an ink cartridge of an inkjet printer and ejecting the droplets, the liquid II can be applied to the liquid composition I on the base material. On this occasion, by applying the liquid II to only a part of the area of the liquid composition I applied on the base material and improving the whiteness in a desired area, a printed image can also be formed.

Hereinafter, in the case of adopting the inkjet method, a portion in which the droplets are applied is also referred to as "printed part", and a portion in which the droplets are not applied is also referred to as "non-printed part".

In this case, in the portion in which the droplets are not applied (non-printed part), in view of the fact that a water vapor in the air atmosphere is condensed on the surface of the wet coating film before drying (hereinafter also referred to as "wet coating film"), the solvent B is phase-separated, and the primary particles in which the solvent B constitutes a core, and the polymer C constitutes a shell are formed and whitened; but, the foregoing portion is lower in the whiteness than the portion in which the droplets are applied (printed part), and a printed image in which a pattern is formed depending upon the height of whiteness can be obtained.

A voltage applied to the print head is preferably 5 V or more, more preferably 10 V or more, and still more preferably 15 V or more, and is also preferably 50 V or less, more preferably 45 V or less, and still more preferably 40 V or less, from the viewpoint of improving the whiteness and the concealment.

A drive frequency of the inkjet head is preferably 1 kHz or more, and more preferably 3 kHz or more, and is also preferably 300 kHz or less, more preferably 150 kHz or less, still more preferably 90 kHz or less, and yet still more preferably 50 kHz or less, from the viewpoint of improving the whiteness and the concealment.

An ejected droplet amount of the liquid II per droplet is 0.01 pL or more, more preferably 0.1 pL or more, still more preferably 1 pL or more, and yet still more preferably 4 pL or more, and is also preferably 50 pL or less, more preferably 40 pL or less, and still more preferably 35 pL or less, from the viewpoint of improving the whiteness and the concealment.

The impact density p of the droplets in terms of the number of dots per square inch is preferably 10,000 or more, more preferably 30,000 or more, and still more preferably 50,000 or more, and is also preferably 3,000,000 or less, more preferably 1,000,000 or less, and still more preferably 500,000 or less. The impact density p of the droplets is calculated from the product of a dot density (dpi) in the direction perpendicular to the transporting direction of the base material and a dot density (dpi) in the transporting direction of the base material.

(Step 3)

In the present invention, from the viewpoint of efficiently improving the whiteness and the concealment, it is preferred that the following step 3 is further included after the step 2.

Step 3: a step of drying the coating film obtained in the step 2 to obtain a polymer coating film Examples of the drying method include stationary drying, blast drying, heat drying, vacuum drying, and infrared drying. Above all, from the viewpoint of simplicity of operation, blast drying and heat drying are preferred. The drying method may be adopted alone or in combination of two or more thereof.

Examples of the heat drying include a method of applying a warm air onto the surface of the coating film; a method of making a heater close to the surface of the coating film to undergo heating; a method of bringing a heater into contact with the surface of the base material at an opposite side to the surface on which the coating film is formed to undergo heating; and a method of undergoing heating by means of steam curing with a high-temperature vapor at atmospheric pressure or high pressure.

A temperature at the time of drying in the step 3 is preferably 100° C. or lower, more preferably 90° C. or lower, still more preferably 80° C. or lower, and yet still more preferably 70° C. or lower from the viewpoint of suppressing the deformation of the coating film, and is also preferably 20° C. or higher, and more preferably 30° C. or higher from the viewpoint of undergoing heating for a short time.

A drying time in the step 3 is preferably 0.5 minutes or more, and more preferably 1 minute or more, and is also preferably 30 minutes or less, more preferably 20 minutes or less, and still more preferably 10 minutes or less.

(Step 4)

In the present invention, in the case where the ratio (d/T) of the average diameter d of the droplets applied in the step 2 to the wet film thickness T of the liquid composition I applied in the step 1 is more than 1, the following step 4 may be further included after the step 2 or the step 3, and preferably after the step 3.

Step 4: a step of water washing the coating film obtained in the step 2 or the step 3

In the case where the polymer C is an ionic polymer, the coating film of a portion in which the droplets have been applied in the step 2 is taken off and the base material surface of the foregoing portion is exposed by the step 4, whereas a portion not applied with the droplets becomes in a state of being coated with the coating film. Thus, a difference in the whiteness between the portion applied with the droplets and the portion not applied with the droplets increases, whereby a printed image having a pattern formed therein can be obtained simply and precisely.

Although examples of the water washing method include flowing water washing and immersion water washing, from the viewpoint of simplicity of operation, flowing water washing is preferred. The water to be used may be any of tap water, ion-exchanged water, RO water, and distilled water.

In the case where the ratio (d/T) of the average diameter d of the droplets applied in the step 2 to the wet film thickness T of the liquid composition I applied in the step 1 is more than 1, the diameter of the droplet becomes larger than the wet film thickness formed of the liquid composition I as shown in FIG. 1.

According to this, since an interface between the liquid composition I and the liquid II containing water is formed over the entirety in the thickness direction of the wet film thickness, hydrophilic primary particles in which the solvent B constitutes a core, and the polymer C constitutes a shell are formed over the entirety in the thickness direction. By water washing the coating film having such a particle structure, the hydrophilic primary particles are dispersed and flowed out in water, and the primary particles in the portion applied with the droplets can be removed over the entirety in the thickness direction, whereby the base material becomes in an exposed state. On the other hand, in the portion not applied with the droplets, in view of the fact that the water vapor in the air atmosphere is condensated on the surface of the wet coating film, the solvent B is phase-separated, and the primary particles in which the solvent B constitutes a core, and the polymer C constitutes a shell are formed and whitened. However, since the foregoing portion is inferior in hydrophilicity of the primary particles to the portion applied with the droplets, with respect to the portion not applied with the droplets, the coating film is hardly removed by means of water washing, and the base material becomes in a state of being coated with the coating film. As a result, it may be considered that a difference in the whiteness between the portion applied with the droplets and the portion not applied with the droplets increases, and patterning can be performed with a high precision.

As for the reason why a difference in the hydrophilicity of the primary particles is produced between the portion applied with the droplets and the portion not applied with the droplets, the following may be conjectured.

In the portion not applied with the liquid II, since the solvent B and the polymer C start to form the primary particles in a state that the amount of the solvent A is relatively large, a specific dielectric constant in the peripheries of the primary particles is relatively low. As a result, dissociation of the ionic group of the polymer C is suppressed while forming the primary particles having a core-shell structure in which the solvent B constitutes the core, and the core is included in the shell of the polymer C. According to this, it may be considered that a hydrophobic functional group of the polymer C is oriented in the outside of the primary particle, and the outside of the primary particle becomes a relatively hydrophobic polymer film to achieve film formation.

On the other hand, in the portion applied with the liquid II, since the solvent B and the polymer C start to form the primary particles in a state that the amount of water is relatively large by the action of the total energy E of the applied droplets and water contained in the liquid II, a specific dielectric constant in the peripheries of the primary particles is relatively high. As a result, dissociation of the ionic group of the polymer C is promoted while forming the primary particles having a core-shell structure in which the solvent B constitutes the core, and the core is included in the shell of the polymer C. According to this, it may be considered that a hydrophilic functional group of the polymer C is oriented in the outside of the primary particle, and the outside of the primary particle becomes a relatively hydrophilic polymer film to achieve film formation.

Figure 2:
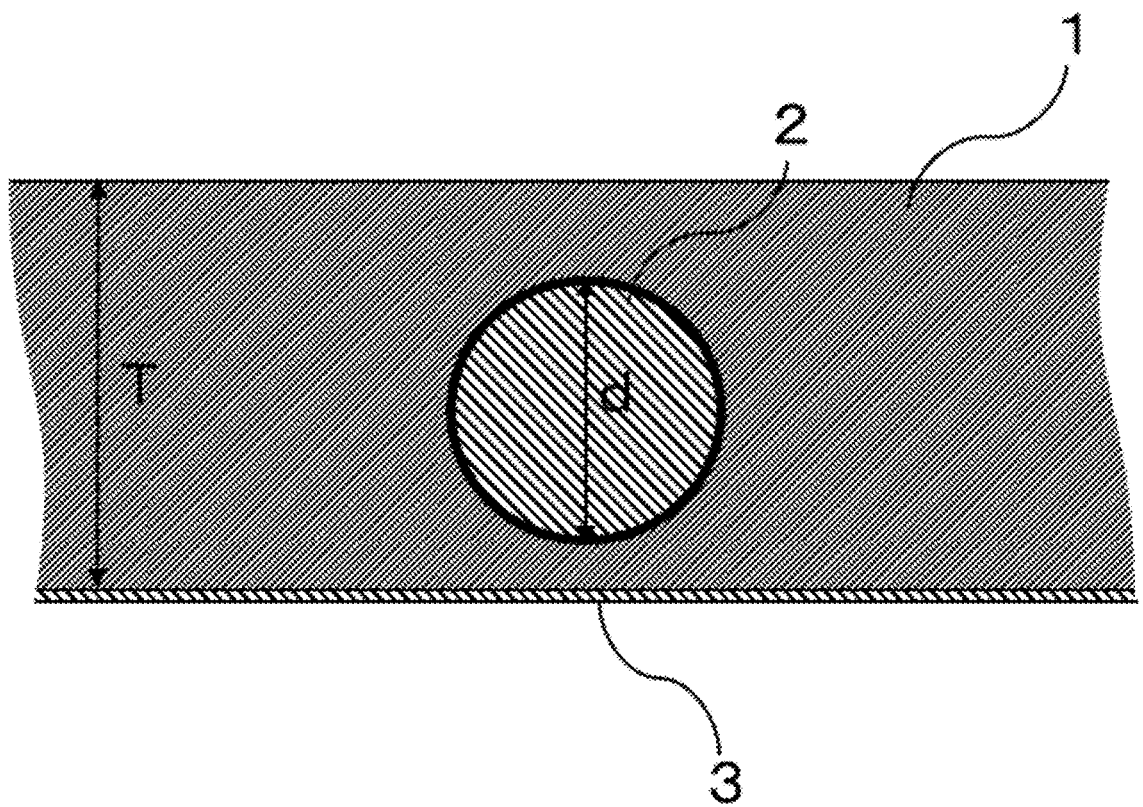
FIG. 2 is a schematic view showing one example of a cross section in which a droplet is applied to the liquid composition I applied on a base material by the method for forming a coating film of the present invention.

On the other hand, in the case where the ratio (d/T) of the average diameter d of the droplets applied in the step 2 to the wet film thickness T of the liquid composition I applied in the step 1 is less than 1, the diameter of the droplet becomes smaller than the wet film thickness formed of the liquid composition I as shown in FIG. 2.

According to this, since the droplets are taken into the wet film thickness, the coating film is formed in a state that the hydrophilic primary particles in which the solvent B constitutes the core, and the polymer C constitutes the shell are sealed in the inside of the coating film.

In the case of water washing the coating film having such a particle structure, since the hydrophilic primary particles are in a state of being sealed in the inside of the coating film, it may be considered that the primary particles in the portion applied with the droplets are hardly dispersed or flowed out in water.

In this way, in the case where the ratio (d/T) of the average diameter d of the droplets applied in the step 2 to the wet film thickness T of the liquid composition I applied in the step 1 is controlled, thereby setting the ratio (d/T) to less than 1, primary particles with high concealment can be formed in the portion applied with the droplets, whereas in the case where the ratio (d/T) is set to more than 1, the hydrophilic primary particles are formed in the portion applied in the droplets, and by further performing water washing, it becomes possible to form a pattern while remaining the coating film in the portion not applied with the droplets.

By forming a pattern on the base material by the method of the present invention, on the occasion of intentionally changing the surface energy, the contact angle, and the shape of a desired area on the base material surface and applying another preparation onto a succeeding base material, the attachment amount, permeability, adhesiveness, and so on to the base material can be changed, and the surface properties can be controlled simply and precisely.

According to the method for forming a coating film of the present invention, even by not using an inorganic pigment, a coating film capable of expressing optical characteristics such that the whiteness is high, and the concealment is excellent can be obtained. Therefore, the method of the present invention is useful as a printing method and an image forming method in various fields. Above all, the method of the present invention is preferably adopted as an inkjet printing method because it is easy to design an image with simplicity and precision. In addition, during forming a coating film by the inkjet printing method, on the occasion of ejecting the resin component from the inkjet head, it is generally known that a mist is generated due to influences of the resin component. However, in the present invention, after the liquid component I containing the resin component is previously applied onto the base material by another method, the liquid II is applied to the wet coating film of the liquid composition I by the inkjet method to perform patterning, whereby fine hydrophilic primary particles can be formed as a printed part in a desired position, and therefore, the generation of a mist containing the resin component can be suppressed. For that reason, according to the method for forming a coating film of the present invention, contamination in the periphery of the pattering part can be suppressed.

EXAMPLES

In the following Synthesis Examples, Preparation Examples, Examples, and Comparative Examples, the terms "parts" and "%" are "parts by mass" and "% by mass", respectively unless otherwise indicated. The measurements of physical properties of polymers and so on were performed by the following methods.

(1) Measurement of Weight Average Molecular Weight of Cationic Polymer CII-1

The measurement was performed using, as an eluent, a liquid in which phosphoric acid and lithium bromide were dissolved in concentrations of 60 mmol/L and 50 mmol/L, respectively in N,N-dimethylformamide by means of the gel permeation chromatography [GPC apparatus (HLC-8320GPC), manufactured by Tosoh Corporation, columns (TSKgel Super AWM-H, TSKgel Super AW3000, TSKgel guardcolumn Super AW-H), manufactured by Tosoh Corporation, flow rate: 1 mL/min] while using, as a standard substance, mono-dispersed polystyrene kits having already-known molecular weights [PStQuick B (F-550, F-80, F-10, F-1, A-1000) and PStQuick C (F-288, F-40, F-4, A-5000, A-500), all of which are manufactured by Tosoh Corporation].

As a measurement sample, one prepared by mixing 0.1 g of the cationic polymer CII-1 and 10 mL of the aforementioned eluent in a glass vial, stirring the mixture with a magnetic stirrer at 25° C. for 10 hours, and filtering the resultant with a syringe filter (DISMIC-13HP PTFE, 0.2 μm, manufactured by Advantech Co., Ltd.) was used.

(2) Measurement of Number Average Molecular Weight of Poly(N-propionylethyleneimine)

The measurement was performed using, as an eluent, 1 mmol/L of FARMIN DM20 (a trade name, manufactured by Kao Corporation)/chloroform by means of the gel permeation chromatography [measurement columns: two columns (K-804L), manufactured by Showa Denko K.K., connected in series, flow rate: 1 mL/min, column temperature: 40° C., detector: differential refractometer] while using, as a standard substance, polystyrene having an already-known molecular weight. 100 μL of the measurement sample having a concentration of 5 mg/mL was used.

(3) Measurement of Viscosity

The viscosity was measured with an E-type viscometer RE80, manufactured by Toki Sangyo Co., Ltd. at a rotation number of 100 rpm for a measurement time of 1 minute by using a standard rotor (1° 34'×R24).

The measurement of the viscosity was performed at 20° C. for hydrogenated polyisobutene, 25° C. for the silicone oil, and 20° C. for the liquid composition I, respectively.

(4) Measurement of pH

The pH at 20° C. was measured with a potable pH meter "F-71" (manufactured by Horiba, Ltd.) using a pH electrode "6337-10D" (manufactured by Horiba, Ltd.).

(5) Measurement of Surface Tension

A platinum plate was immersed in a columnar polyethylene-made vessel (3.6 cm in diameter×1.2 cm in depth) in which 5 g of the sample adjusted at 20° C. was charged, and a static surface tension at 20° C. was measured with a surface tension meter ("CBVP-Z", manufactured by Kyowa Interface Science Co., Ltd.) by the Wilhelmy method.

(6) Measurement of Wet Film Thickness T by Wire Bar-Coating

In an environmental chamber, the temperature and humidity of which were controlled at a temperature of 25° C. and a humidity of 50%, an A4-sized transparent PET film (a trade name: LUMIRROR T-60, manufactured by Toray Industries, Inc., film thickness: 75 μm), the weight of which had been measured in advance, was placed on a desktop coater (a trade name: TC-1, manufactured by Mitsui Electric Co., Ltd.), and then, a wire bar to be wanted to confirm the wet film thickness was set. Subsequently, about 2 to 6 mL of a mixed solution of 10% of ethanol, 50% of water, and 40% of glycerin was dropped using a dropper, and immediately thereafter, the mixed solution was coated on the PET film using the above-set wire bar at a traveling speed of the wire bar of 1 m/min. On the occasion of coating, it was confirmed that the aforementioned mixed solution uniformly spread on the entire surface of the PET film, and the liquid leaked from the end. Subsequently, the weight of the coated PET film was immediately measured and corrected with a specific gravity of the aforementioned mixed solution, thereby calculating the wet film thickness T on the occasion of using the wire bar.

Details of the respective components are as follows.
(Anionic Polymer CI)

ULTRAHOLD 8: An acrylic acid/acrylic acid alkyl ester/(N-alkyl) acrylamide copolymer (manufactured by BASF Japan Ltd., a trade name: ULTRAHOLD 8), powder with a solid component content of 100%

ULTRAHOLD STRONG: An acrylic acid/acrylic acid alkyl ester/(N-alkyl) acrylamide copolymer (manufactured by BASF Japan Ltd., a trade name: ULTRAHOLD STRONG), powder with a solid component content of 100%

ULTRAHOLD POWER-dry: A powder prepared by drying a solution of an acrylic acid/acrylic acid alkyl ester/(N-alkyl) acrylamide copolymer (solid component content: 32%) (manufactured by BASF Japan Ltd., a trade name: ULTRAHOLD POWER)
(Cationic Polymer CII-1)

Cationic polymer 1: A copolymer obtained in the following Synthesis Example 1

Cationic polymer 2: A copolymer obtained in the following Synthesis Example 2
(Cationic Silicone Polymer CII-2)

Cationic silicone polymer 1: A poly(N-propionylethyleneimine)/dimethylpolysiloxane copolymer obtained in the following Synthesis Example 3

Cationic silicone polymer 2: A poly(N-propionylethyleneimine)/dimethylpolysiloxane copolymer obtained in the following Synthesis Example 4

Cationic silicone polymer 3: A poly(N-propionylethyleneimine)/dimethylpolysiloxane copolymer obtained in the following Synthesis Example 5
(Betaine Polymer CIII)

YUKA FORMER SM-dry: A powder prepared by drying an ethanol solution of an N-methacryloyloxyethyl-N,N-dimethylammonium-α-N-methylcarboxybetaine/met hacrylic acid alkyl ester copolymer (solid component content: 30%) (manufactured by Mitsubishi Chemical Corporation, a trade name: YUKA FORMER SM)

RAM RESIN 1000-dry: A powder prepared by drying an ethanol solution of an N-methacryloyloxyethyl-N,N-dimethylammonium-α-N-methylcarboxybetaine/met hacrylic acid alkyl ester copolymer (solid component content: 30%) (manufactured by Osaka Organic Chemical Industry Ltd., a trade name: RAM RESIN-1000, molecular weight: 100,000)

RAM RESIN 2000-dry: A powder prepared by drying an ethanol solution of an N-methacryloyloxyethyl-N,N-dimethylammonium-α-N-methylcarboxybetaine/met hacrylic acid alkyl ester copolymer (solid component content: 30%) (manufactured by Osaka Organic Chemical Industry Ltd., a trade name: RAM RESIN-2000, molecular weight: 40,000)

RAM RESIN 3000-dry: A powder prepared by drying an ethanol solution of an N-methacryloyloxyethyl-N,N-dimethylammonium-α-N-methylcarboxybetaine/met hacrylic acid alkyl ester copolymer (solid component content: 30%) (manufactured by Osaka Organic Chemical Industry Ltd., a trade name: RAM RESIN-3000, molecular weight: 40,000)

(Nonionic Polymer)

Polyvinyl butyral: S-LEC BM-1 (manufactured by Sekisui Chemical Co., Ltd., a trade name), powder with a solid component content of 100%

Polyurethanepolyurea: A powder prepared by drying BAYCUSAN C2000 (manufactured by Covestro Japan Ltd., a trade name, an ethanol solution of polyurethane-64 with a solid component content of 40%)

(Solvent B)

[Hydrocarbon Oil]

PARLEAM 3: Hydrogenated polyisobutene (manufactured by NOF Corporation, a trade name: PARLEAM 3, boiling point: 179° C., Ra: 45, viscosity: 1.4 mPa·s)

PARLEAM 4: Hydrogenated polyisobutene (manufactured by NOF Corporation, a trade name: PARLEAM 4, boiling point: 262° C., Ra: 45, viscosity: 3.7 mPa·s)

[Silicone Oil]

KF-96A-1cs: Trisiloxane (manufactured by Shin-Etsu Chemical Co., Ltd., a trade name: KF-96A-1cs, boiling point: 153° C., Ra: 45, viscosity: 0.9 mPa·s)

TMF-1.5: Methyltrimethicone (manufactured by Shin-Etsu Chemical Co., Ltd., a trade name: TMF-1.5, boiling point: 191° C., Ra: 45, viscosity: 1.4 mPa·s)

Synthesis Example 1 (Synthesis of Cationic Polymer 1)

In a reaction vessel equipped with two dropping funnels 1 and 2, monomers having a composition shown in the "Initially charged monomer solution" column of Table 1 were charged, followed by purging with a nitrogen gas.

Meanwhile, monomers and an organic solvent having a composition shown in the "Dropping monomer solution" column of Table 1 were mixed to prepare a dropping monomer solution; separately, an organic solvent and a polymerization initiator (2,2'-azobis(2,4-dimethylvaleronitrile): manufactured by Fujifilm Wako Pure Chemical Corporation, a trade name: V-65) were mixed to prepare a polymerization initiator solution; and they were charged in the dropping funnels 1 and 2, respectively, followed by purging with a nitrogen gas.

The initially charged monomer solution in the reaction vessel was kept at 62° C. in a nitrogen atmosphere while stirring, and the dropping monomer solution and the polymerization initiator solution were gradually dropped in the reaction vessel over 2 hours such that a proportion of the polymerization initiator to be dropped became constant relative to the monomers to be dropped.

After completion of dropping, the resultant was stirred for 1 hour while keeping at 62° C. with stirring, and subsequently, 47 parts of acetone was added. The contents were further kept at 62° C. while stirring and thermally aged for 4 hours.

Subsequently, the unreacted monomers and the polymerization initiator residue were removed from the reaction product by using an ultrafiltration membrane (manufactured by NGK Insulators, Ltd., a ceramic-made ultrafiltration membrane, a trade name: CEFILT, pore diameter: 10 nm), and the residue was then dried to obtain a cationic amphipathic polymer (hereinafter also referred to as "cationic polymer 1"). A weight average molecular weight of the obtained cationic polymer 1 was 130,000.

Synthesis Example 2 (Synthesis of Cationic Polymer 2)

In a reaction vessel equipped with two dropping funnels 1 and 2, monomers having a composition shown in the "Initially charged monomer solution" column of Table 1 were charged, followed by purging with a nitrogen gas.

Meanwhile, monomers and an organic solvent having a composition shown in the "Dropping monomer solution" column of Table 1 were mixed to prepare a dropping monomer solution; and separately, a polymerization initiator (V-65) shown in the "Polymerization initiator solution" column of Table 1 were charged in the dropping funnels 1 and 2, respectively, followed by purging with a nitrogen gas.

The initially charged monomer solution in the reaction vessel was kept at 55° C. in a nitrogen atmosphere while stirring, and the dropping monomer solution and the polymerization initiator solution were gradually dropped in the reaction vessel over 2 hours such that a proportion of the polymerization initiator to be dropped became constant relative to the monomers to be dropped.

After completion of dropping, the contents were further kept at 55° C. while stirring and thermally aged for 5 hours.

Subsequently, the unreacted monomers and the polymerization initiator residue were removed from the reaction product by using an ultrafiltration membrane (manufactured by NGK Insulators, Ltd., a ceramic-made ultrafiltration membrane, a trade name: CEFILT, pore diameter: 10 nm), and the residue was then dried to obtain a cationic amphipathic polymer (hereinafter also referred to as "cationic polymer 2"). A weight average molecular weight of the obtained cationic polymer 2 was 120,000.

TABLE 1

| | | Synthesis Example 1 | | | Synthesis Example 2 | | |
|---|---|---|---|---|---|---|---|
| | | Reaction vessel Initially charged monomer solution | Dropping funnel 1 Dropping monomer solution | Dropping funnel 2 Polymerization initiator solution | Reaction vessel Initially charged monomer solution | Dropping funnel 1 Dropping monomer solution | Dropping funnel 2 Polymerization initiator solution |
| Monomer composition (active | DMAPAA *1 | 1.5 | 13.5 | | 1.0 | 9.0 | |
| | Ethyl acrylate | 2.5 | 22.5 | | 2.0 | 18.0 | |

TABLE 1-continued

|  |  | Synthesis Example 1 | | | Synthesis Example 2 | | |
| --- | --- | --- | --- | --- | --- | --- | --- |
|  |  | Reaction vessel Initially charged monomer solution | Dropping funnel 1 Dropping monomer solution | Dropping funnel 2 Polymerization initiator solution | Reaction vessel Initially charged monomer solution | Dropping funnel 1 Dropping monomer solution | Dropping funnel 2 Polymerization initiator solution |
| ingredient) (parts) | t-BuAAm *2 | 5.0 | 45.0 |  | 4.5 | 40.5 |  |
|  | NK ESTER M-90G *3 | 1.0 | 9.0 |  | 2.5 | 22.5 |  |
| Organic solvent (parts) | Acetone | 18.6 | 111.4 | 55.7 |  |  |  |
|  | Ethanol |  |  |  | 10.0 | 60.0 | 30.0 |
| Polymerization initiator (parts) | V-65 *4 |  |  | 0.66 |  |  | 0.33 |
| Kind of cationic polymer CII-1 |  | Cationic polymer 1 | | | Cationic polymer 1 | | |
| Weight average molecular weight of cationic polymer CII-1 |  | 130,000 | | | 120,000 | | |

*1 N-[3-(Dimethylamino)propyl]acrylamide, manufactured by Sigma-Aldrich Co.
*2 N-tert-Butyl acrylamide, manufactured by Sigma-Aldrich Co.
*3 Methoxypolyethylene glycol monomethacrylate, manufactured by Shin-Nakamura Chemical Co., Ltd., a trade name: NK ESTER M-90G (ethylene oxide average addition molar number = 9, end: methyl group)
*4 2,2'-Azobis(2,4-dimethylvalelonitrile), manufactured by Fujifilm Wako Pure Chemical Corporation, a trade name: V-65

Synthesis Example 3 (Synthesis of Cationic Silicone Polymer 1)

12.9 g (0.13 mol) of 2-ethyl-2-oxazoline and 27.7 g of ethyl acetate were mixed, and the mixed liquid was dehydrated with 2.0 g of a molecular sieve (ZEOLUM A-4, manufactured by Tosoh Corporation) at 28° C. for 15 hours. To the resulting dehydrated ethyl acetate solution of 2-ethyl-2-oxazoline, 0.77 g (0.005 mol) of dliethyl sulfate was added, and the contents were heat-refluxed in a nitrogen atmosphere at 80° C. for 8 hours, to obtain a terminal reactive poly(N-propionylethyleneimine) (number average molecular weight: 2,700) solution.

Separately, 100.0 g of side-chain primary aminopropyl-modified polydimethylsiloxane (manufactured by Shin-Etsu Chemical Co., Ltd., a trade name: KF-8015, weight average molecular weight: 100,000 (catalogue value), amine equivalent: 20,000) and 203.0 g of ethyl acetate were mixed, and the mixed liquid was dehydrated with 15.2 g of a molecular sieve at 28° C. for 15 hours.

Subsequently, the above-obtained terminal reactive poly (N-propionylethyleneimine) solution was collectively added to the side-chain primary aminopropyl-modified polydimethylsiloxane solution, and the contents were heat-refluxed at 80° C. for 10 hours. The obtained reaction mixture was concentrated under reduced pressure to obtain a poly(N-propionylethyleneimine)/dimethylpolysiloxane copolymer (hereinafter also referred to as "cationic silicone polymer 1") as a white rubber-like solid (108 g). A weight average molecular weight of the cationic silicone polymer 1 was 115,000 (calculated value), and a mass ratio [{content of organopolysiloxane segment (x)}/[total content of {organopolysiloxane segment (x)} and {poly(N-acylalkyleneimine) segment (y)}]] was 0.87.

Synthesis Example 4 (Synthesis of Cationic Silicone Polymer 2)

53.3 g (0.54 mol) of 2-ethyl-2-oxazoline and 127.5 g of ethyl acetate were mixed, and the mixed liquid was dehydrated with 9.0 g of a molecular sieve (ZEOLUM A-4, manufactured by Tosoh Corporation) for 15 hours. To the resulting dehydrated ethyl acetate solution of 2-ethyl-2-oxazoline, 9.48 g (0.061 mol) of diethyl sulfate was added, and the contents were heat-refluxed in a nitrogen atmosphere at 80° C. for 8 hours, to obtain a terminal reactive poly(N-propionylethyleneimine) (number average molecular weight: 1,300)

Solution

Separately, 153.7 g of side-chain primary aminopropyl-modified polydimethylsiloxane (manufactured by Shin-Etsu Chemical Co., Ltd., a trade name: KF-8003, weight average molecular weight: 40,000 (catalogue value), amine equivalent: 2,000) and 312.1 g of ethyl acetate were mixed, and the mixed liquid was dehydrated with 23.3 g of a molecular sieve at 28° C. for 15 hours.

Subsequently, the above-obtained terminal reactive poly (N-propionylethyleneimine) solution was collectively added to the side-chain primary aminopropyl-modified polydimethylsiloxane solution, and the contents were heat-refluxed at 80° C. for 10 hours. The reaction mixture was concentrated under reduced pressure to obtain a poly(N-propionylethyleneimine)/dimethylpolysiloxane copolymer (hereinafter also referred to as "cationic silicone polymer 2") as a pale yellow rubber-like solid (200 g). A weight average molecular weight of the cationic silicone polymer 2 was 56,000 (calculated value), and a mass ratio [{content of organopolysiloxane segment (x)}/[total content of {organopolysiloxane segment (x)} and {poly(N-acylalkyleneimine) segment (y)}]] was 0.71.

Synthesis Example 5 (Synthesis of Cationic Silicone Polymer 3)

73.7 g (0.74 mol) of 2-ethyl-2-oxazoline and 156.0 g of ethyl acetate were mixed, and the mixed liquid was dehydrated with 12.0 g of a molecular sieve (ZEOLUM A-4, manufactured by Tosoh Corporation) at 28° C. for 15 hours. To the resulting dehydrated ethyl acetate solution of 2-ethyl-2-oxazoline, 2.16 g (0.014 mol) of diethyl sulfate was added, and the contents were heat-refluxed in a nitrogen atmosphere at 80° C. for 8 hours, to obtain a terminal reactive poly(N-propionylethyleneimine) (number average molecular weight: 6,000) solution.

Separately, 70.0 g of side-chain primary aminopropyl-modified polydimethylsiloxane (KF-864, manufactured by Shin-Etsu Silicone Co., Ltd., weight average molecular weight: 50,000 (catalogue value), amine equivalent: 3,800) and 140.0 g of ethyl acetate were mixed, and the mixed liquid was dehydrated with 15.0 g of a molecular sieve at 28° C. for 15 hours.

Subsequently, the above-obtained terminal reactive poly (N-propionylethyleneimine) solution was collectively added to the side-chain primary aminopropyl-modified polydimethylsiloxane solution, and the contents were heat-refluxed at 80° C. for 10 hours. The reaction mixture was concentrated under reduced pressure to obtain a poly(N-propionylethyleneimine)/dimethylpolysiloxane copolymer (hereinafter also referred to as "cationic silicone polymer 3") as a white rubber-like solid (135 g). A weight average molecular weight of the cationic silicone polymer 3 was 100,000 (calculated value), and a mass ratio [{content of organopolysiloxane segment (x)}/[total content of {organopolysiloxane segment (x)} and {poly(N-acylalkyleneimine) segment (y)}]] was 0.50.

Preparation Examples 1-1 to 1-6 and Comparative Preparation Examples 1-1 to 1-7

<Preparation of Liquid Composition I>

3 parts of ULTRAHOLD 8 (powder with a solid component content of 100%) and 3 parts of YUKA FORMER SM-dry as the polymer C were dissolved in the solvent A described in Table 2; after confirming that the solution was transparent and free from a floating material and a precipitate, the solvent B described in Table 2 was added; the contents were stirred and homogenized; and the resultant was filtered with a filter having a pore diameter of 0.20 μm. There were thus obtained liquid compositions I1-1 to I1-6 and I1-C1 to I1-C7. As for the used filter, from the viewpoint of solvent resistance of the filter itself, a cellulose acetate syringe filter, manufactured by Advantech Co., Ltd. was used for the liquid compositions I1-1 to I1-6, I1-C1 to I1-C2, and I1-C7, and a PTFE syringe filter, manufactured by Advantech Co., Ltd. was used for the liquid compositions I1-C3 to I1-C6.

The dissolved amount of the polymer C used in Preparation Example 1-1 in 100 g of the solvent A was 43 g, and the dissolved amount thereof in 100 g of the solvent B was 2.2 g. In addition, the dissolved amount of the polymer C used in Preparation Examples 1-2 to 1-6 in 100 g of the solvent B was less than 5 g, and the dissolved amount thereof in 100 g of the solvent A was 5 g or more.

Examples 1-1 to 1-6 and Comparative Examples 1-1 to 1-7

<Formation of Coating Film>
(Step 1)

In an environmental chamber, the temperature and humidity of which were controlled at a temperature of 25° C. and a humidity of 50%, a glass substrate (manufactured by Matsunami Glass Ind., Ltd., MAS-coated slide glass S9215) as a base material was fixed on a desktop coater (a trade name: TC-1, manufactured by Mitsui Electric Co., Ltd.) such that the MAS-coated surface was positioned at the front surface side; 1 mL of each of the liquid compositions shown in Table 2 was dropped on the end of the slide glass; and immediately thereafter, the respective liquid composition was coated on the glass substrate using a No. 30 wire bar (wet film thickness T: 60 μm) at a traveling speed of 1 m/min.

(Step 2)

During an interval of 3 to 5 seconds after coating the respective liquid composition, droplets of ion-exchanged water as the liquid II were applied in an ejected droplet amount shown in Table 2 to the surface of the liquid composition on the base material from the perpendicular upper surface direction by using a handy inkjet printer (manufactured by Kishu Giken Kogyo Co., Ltd., a trade name: KGKJET HQ1000H) which was repaired such that printing could be performed under a printing condition of 600 dpi.

As for an ink cartridge, a TK403 Black-CS cartridge (manufactured by Kishu Giken Kogyo Co., Ltd.) was used after washing the inside thereof with ion-exchanged water and ethanol, filling ion-exchanged water having an electrical conductivity of 0.6 microsiemens or less, collecting the ion-exchanged water ejected from an inkjet head, and then confirming that the electrical conductivity became 1.0 uS/cm or less.

In addition, a printed image was printed by using a solid image of 12.7 mm in length and 50.8 mm in width (impact density p: 360,000 (dots per square inch) at a resolution of 600 dpi in length and 600 dpi in width.

(Step 3)

Figure 3:
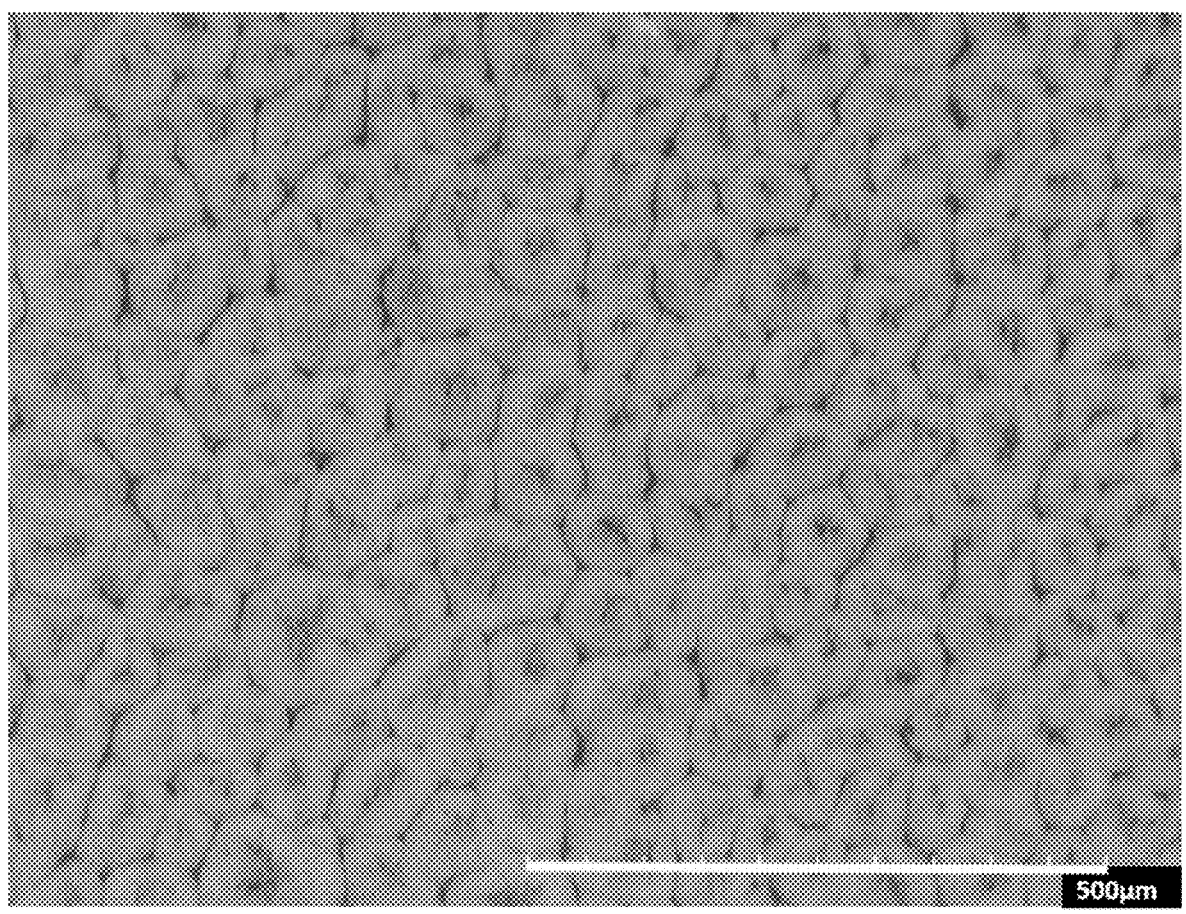
FIG. 3 is an optical microscopic photograph (magnification: 250 times) of a coating film obtained in Example 1-2 as taken from the upper surface side.
Figure 4:
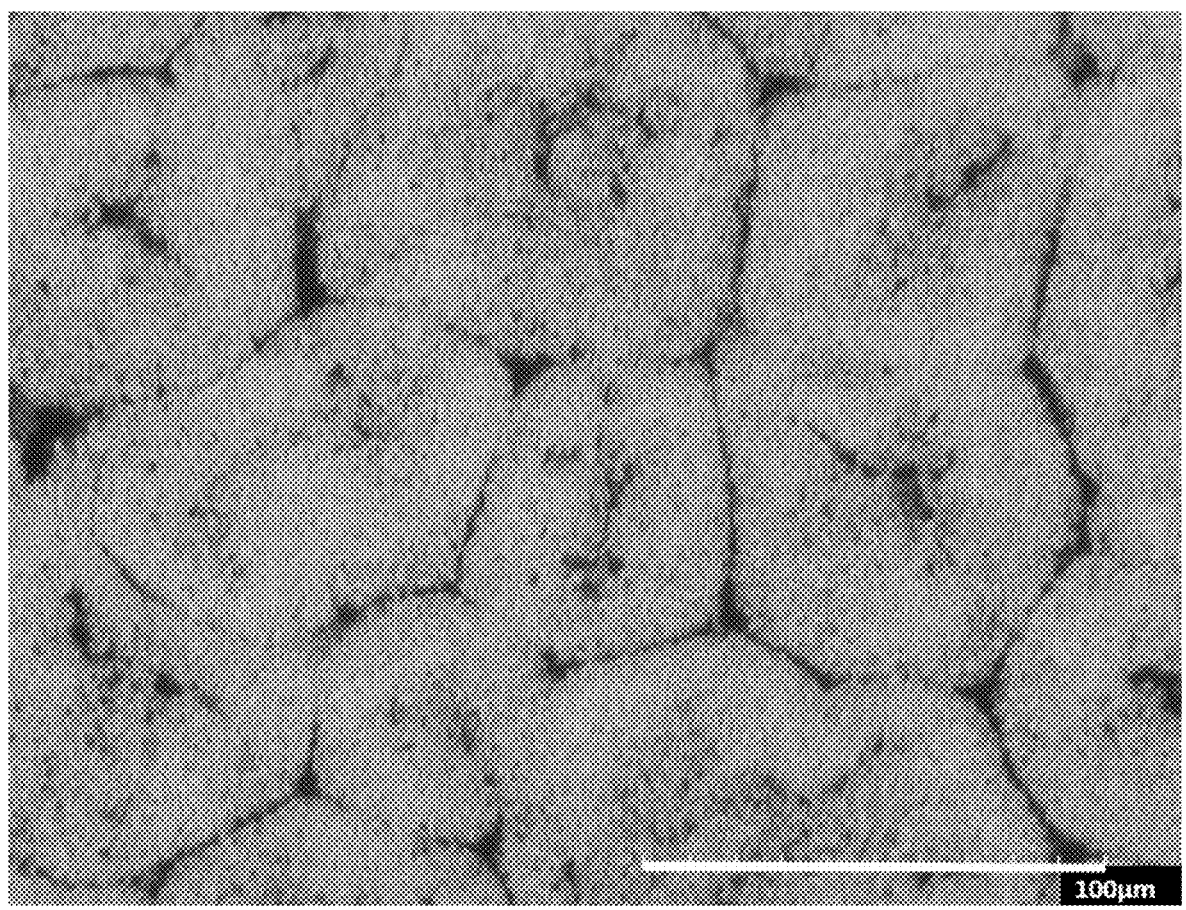
FIG. 4 is an optical microscopic photograph (magnification: 1,000 times) of a coating film obtained in Example 1-2 as taken from the upper surface side.
Figure 5:
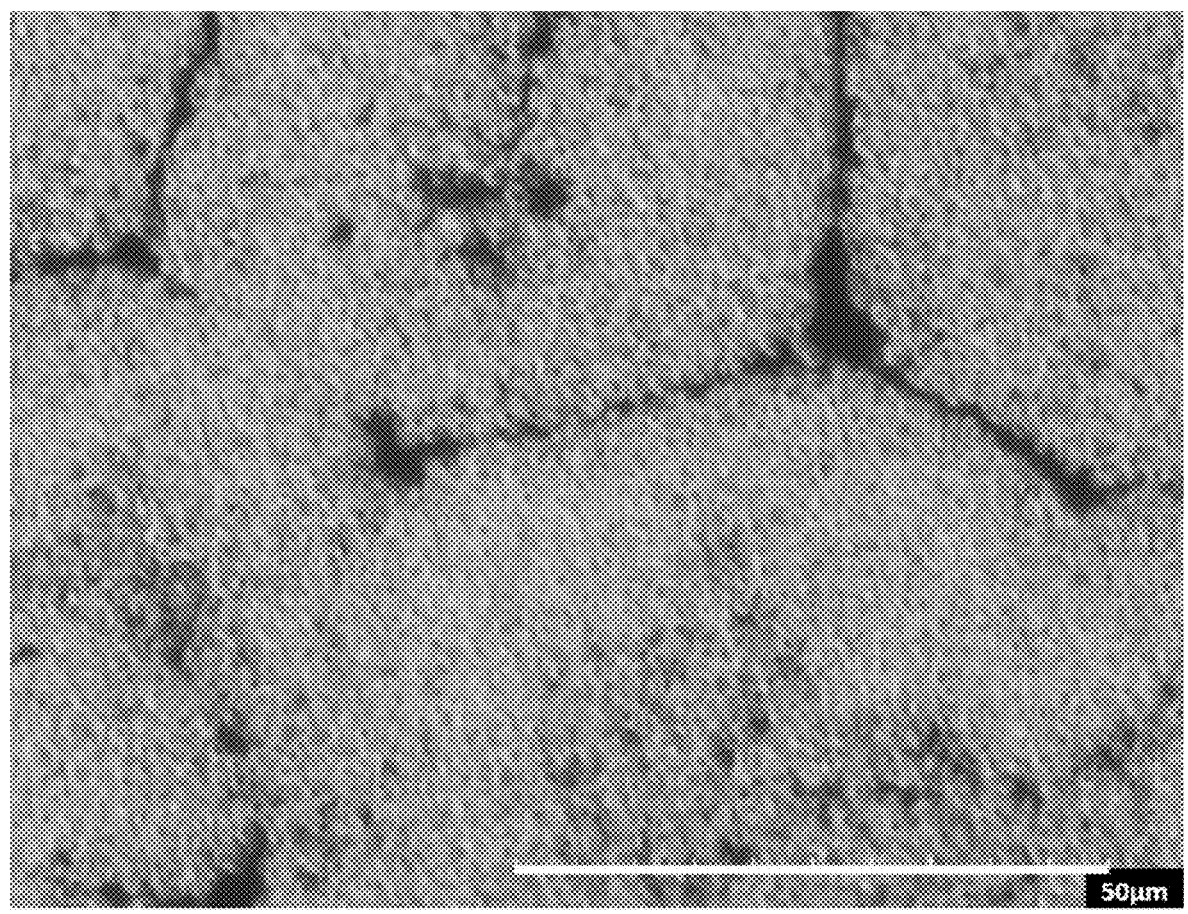
FIG. 5 is an optical microscopic photograph (magnification: 2,500 times) of a coating film obtained in Example 1-2 s taken from the upper surface side.

The coating film formed on the glass substrate obtained in the step 2 was stationarily dried for 30 minutes in an environmental chamber, the temperature and humidity of which were controlled at a temperature of 25° C. and a humidity of 50%, thereby obtaining dried polymer coating films 1-1 to 1-6 and 1-C1 to 1-C7 formed from the respective liquid compositions. As a result of observation with an optical microscope (manufactured by Hirox Co., Ltd., a trade name: RH-2000), it was confirmed that an aggregate of secondary particles resulting from accumulation of primary particles was formed on the surface of the obtained coating film. Optical microscopic photographs taken from the upper surface side of the coating film obtained in Example 1-2 are shown in FIGS. 3 to 5.

<Evaluation of Whiteness>

The whiteness as an index of optical characteristics was evaluated.

In conformity with JIS K5101-4:2004, one sheet of each of the coating films obtained in the Examples and Comparative Examples was placed in a black part of a hiding-chart, and a black image density of the portion to which the ion-exchanged water was applied as the liquid II was measured. As a measuring device of the image density, a spectrophotometer/densitometer (manufactured by X-Rite, Inc., a trade name: SpectroEye) was used. The measurement condition was light source: D65, observation field: 2°, density standard: DIN, white base: "Abs", and built-in filter: "No". The results are shown in Table 2.

As a result of measurement of the image density of the non-coated glass substrate, a measured value was 2.25. It is indicated that the smaller the measured value, the higher the whiteness, and the more excellent the concealment. The measured value is preferably 1 or less, and in this case, the whiteness is high, and the concealment is excellent.

TABLE 2

| | | | | Boiling point (°C.) | Ra | Example 1-1 I1-1 | Example 1-2 I1-2 | Example 1-3 I1-3 | Example 1-4 I1-4 | Example 1-5 I1-5 | Comp. Ex. 1-1 I1-C1 | Comp. Ex. 1-2 I1-C2 | Comp. Ex. 1-3 I1-C3 | Comp. Ex. 1-4 I1-C4 | Example 1-6 I1-6 | Comp. Ex. 1-5 I1-C5 | Comp. Ex. 1-6 I1-C6 | Comp. Ex. 1-7 I1-C7 |
|---|---|---|---|---|---|---|---|---|---|---|---|---|---|---|---|---|---|---|
| Step 1 | Composition (parts) | Solvent A | Methanol | 65 | 20 | 84 | | | | | | | | | | | | |
| | | | Ethanol | 78 | 24 | | 84 | | | | | | | | 84 | 84 | 84 | 94 |
| | | | Propanol | 97 | 27 | | | 84 | | | | | | | | | | |
| | | | Isopropanol | 82 | 28 | | | | 84 | | | | | | | | | |
| | | | tert-Butyl alcohol | 82 | 30 | | | | | 84 | | | | | | | | |
| | | | Butanol | 118 | 28 | | | | | | 84 | | | | | | | |
| | | | Pentanol | 138 | 30 | | | | | | | 84 | | | | | | |
| | | | Chloroform | 61 | 39 | | | | | | | | 84 | | | | | |
| | | | Toluene | 111 | 43 | | | | | | | | | 84 | | | | |
| | | Solvent B | PARLEAM 3 | 179 | 45 | 10 | 10 | 10 | 10 | 10 | 10 | 10 | 10 | 10 | | | | |
| | | | Isododecane | 177 | 45 | | | | | | | | | | 10 | | | |
| | | | Hexane | 69 | 45 | | | | | | | | | | | 10 | | |
| | | | Dimethylformamide | 153 | 31 | | | | | | | | | | | | 10 | |
| | | Polymer C | ULTRAHOLD 8 | | | 3 | 3 | 3 | 3 | 3 | 3 | 3 | 3 | 3 | 8 | 3 | 3 | 3 |
| | | | YUKA FORMER SM-dry | | | 3 | 3 | 3 | 3 | 3 | 3 | 3 | 3 | 3 | 3 | 3 | 3 | 3 |
| | Viscosity of liquid composition I (mPa·s) | | | | | 6.7 | 12.2 | 24.3 | 18.7 | 15.5 | 39.3 | 87.3 | 42.2 | 6.8 | 11.8 | 10.3 | 10.2 | 10.0 |
| | Wet film thickness T (μm) | | | | | 60 | 60 | 60 | 60 | 60 | 60 | 60 | 60 | 60 | 60 | 60 | 60 | 60 |
| Step 2 | Ejected droplet amount of liquid II (pL) | | | | | 33 | 33 | 33 | 33 | 33 | 33 | 33 | 33 | 33 | 33 | 33 | 33 | 33 |
| | Average speed of droplets (m/s) | | | | | 15 | 15 | 15 | 15 | 15 | 15 | 15 | 15 | 15 | 15 | 15 | 15 | 15 |
| | Average diameter d of droplets (μm) | | | | | 40 | 40 | 40 | 40 | 40 | 40 | 40 | 40 | 40 | 40 | 40 | 40 | 40 |
| Evaluation | Coating film No. | | | | | 1-1 | 1-2 | 1-3 | 1-4 | 1-5 | 1-C1 | 1-C2 | 1-C3 | 1-C4 | 1-6 | 1-C5 | 1-C6 | 1-C7 |
| | Whiteness (image density) | | | | | 0.26 | 0.21 | 0.45 | 0.35 | 0.27 | 2.22 | 2.32 | 1.76 | 1.82 | 0.35 | 2.00 | 2.16 | 2.22 |

From Table 2, it is noted that the coating films 1-1 to 1-6 obtained in Examples 1-1 to 1-6 are high in the whiteness and exhibit high concealment even without containing an inorganic pigment. On the other hand, in view of the fact that the coating films 1-C1 to 1-C7 obtained in Comparative Examples 1-1 to 1-7 are low in the whiteness, the desired concealment was not expressed.

Examples 2-1 to 2-5 and Comparative Example 2-1

(Step 1)
A liquid composition I1-2 was coated on a glass substrate in the same manner as in the step 1 of Example 1-2, except that the temperature and humidity conditions in the environmental chamber were changed to 25° C. for the temperature and to 10% for the humidity.

(Step 2)
The same operation as in the step 2 of Example 1-2 was followed, except that the ion-exchanged water was applied by averagely thinning out a part of the printed image such that the solid image of 12.7 mm in length and 50.8 mm had a impact density as described in Table 3 at a resolution of 600 dpi in length and 600 dpi in width.

What the impact density p was 0 means that only the liquid composition was coated, but the ion-exchanged water was not applied, namely the step 2 was not performed.

(Step 3)
The coating film formed on the glass substrate obtained in the step 2 was stationarily dried for 30 minutes in an environmental chamber, the temperature and humidity of which were controlled at a temperature of 25° C. and a humidity of 10%, thereby obtaining dried polymer coating films 2-1 to 2-5 and 2-C1.

Subsequently, the whiteness of the portion of the obtained polymer coating film to which the ion-exchanged water was applied was evaluated in the same manner as mentioned above. The results are shown in Table 3.

Example 2-6

(Step 1)
In an environmental chamber, the temperature and humidity of which were controlled at a temperature of 25° C. and a humidity of 10%, ion-exchanged water having an electrical conductivity of 0.1 uS/cm was filled in an intermediate tank of yellow color of a thermal inkjet printer (manufactured by LG Electronics Incorporated).

The inkjet head was used after washing the inside thereof with ion-exchanged water and ethanol, filling ion-exchanged water having an electrical conductivity of 0.1 uS/cm or less, collecting the ion-exchanged water ejected from an inkjet head, and then confirming that the electrical conductivity became 1.0 uS/cm or less.

A glass substrate (manufactured by Matsunami Glass Ind., Ltd., MAS-coated slide glass S9215) was fixed on a printing medium of the aforementioned inkjet printer such that the MAS-coated surface was positioned at the front surface side; 1 mL of the liquid composition I1-2 was dropped on the end of the slide glass; and immediately thereafter, using a No. 30 wire bar (wet film thickness T: 60 μm), the liquid composition I1-2 was coated on the glass substrate at a traveling speed of the wire bar of 1 m/min.

(Step 2)
During an interval of 3 to 5 seconds after coating the liquid composition I1-2, droplets of ion-exchanged water as the liquid II were applied in the ejected droplet amount shown in Table 3 by using the aforementioned inkjet printer. The printed image was printed by using a solid image of 12.7 mm in length and 50.8 mm in width at a resolution of 1600 dpi in length and 1600 dpi in width.

(Step 3)

The coating film formed on the glass substrate obtained in the step 2 was stationarily dried for 30 minutes in an environmental chamber, the temperature and humidity of which were controlled at a temperature of 25° C. and a humidity of 10%, thereby obtaining a dried polymer coating film 2-6.

Subsequently, the whiteness of the portion of the obtained polymer coating film to which the ion-exchanged water was applied was evaluated in the same manner as mentioned above. The results are shown in Table 3.

Examples 2-7 to 2-10

(Step 1)

In an environmental chamber, the temperature and humidity of which were controlled at a temperature of 25° C. and a humidity of 10%, using an inkjet printer (manufactured by Tritek Co., Ltd., a trade name: OnePass JET), ion-exchanged water was filled in an inkjet head (manufactured by Kyocera Corporation, model No.: KJ4B-QA06NTB).

The inkjet head was used after washing the inside thereof with ion-exchanged water and ethanol, filling ion-exchanged water having an electrical conductivity of 0.6 microsiemens or less, collecting the ion-exchanged water ejected from an inkjet head, and then confirming that the electrical conductivity became 1.0 uS/cm or less.

A glass substrate (manufactured by Matsunami Glass Ind., Ltd., MAS-coated slide glass S9215) was fixed on a carriage of a printing medium of the aforementioned inkjet printer such that the MAS-coated surface was positioned at the front surface side; 1 mL of the liquid composition I1-2 was dropped on the end of the slide glass; and immediately thereafter, using a No. 30 wire bar (wet film thickness T: 60 μm), the liquid composition I1-2 was coated on the glass substrate at a traveling speed of the wire bar of 1 m/min.

(Step 2)

During an interval of 3 to 5 seconds after coating the liquid composition I1-2, droplets of ion-exchanged water as the liquid II were applied in the ejected droplet amount described in Table 3 by using the aforementioned inkjet printer set under a printing condition of 600 dpi×600 dpi. A solid image of 12.7 mm in length and 50.8 mm in width was used as the printed image.

(Step 3)

The coating film formed on the glass substrate obtained in the step 2 was stationarily dried for 30 minutes in an environmental chamber, the temperature and humidity of which were controlled at a temperature of 25° C. and a humidity of 10%. There were thus obtained dried polymer coating films 2-7 to 2-10.

Subsequently, the whiteness of the portion of each of the obtained polymer coating films to which the ion-exchanged water was applied was evaluated in the same manner as mentioned above. The results are shown in Table 3.

TABLE 3

| | | | | | | | | Example | | | | | | | Comparative Example |
|---|---|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 | 2-1 |
| | | Liquid composition I No. | | I1-2 | I1-2 | I1-2 | I1-2 | I1-2 | I1-2 | I1-2 | I1-2 | I1-2 | I1-2 | I1-2 |
| Step 1 | Composition (parts) | Solvent A | Ethanol | 84 | 84 | 84 | 84 | 84 | 84 | 84 | 84 | 84 | 84 | 84 |
| | | Solvent B | PARLEAM 3 | 10 | 10 | 10 | 10 | 10 | 10 | 10 | 10 | 10 | 10 | 10 |
| | | Polymer C | ULTRAHOLD 8 | 3 | 3 | 3 | 3 | 3 | 3 | 3 | 3 | 3 | 3 | 3 |
| | | | YUKA FORMER SM-dry | 3 | 3 | 3 | 3 | 3 | 3 | 3 | 3 | 3 | 3 | 3 |
| | Viscosity of liquid composition I (mPa·s) | | | 12.2 | 12.2 | 12.2 | 12.2 | 12.2 | 12.2 | 12.2 | 12.2 | 12.2 | 12.2 | 12.2 |
| | Wet film thickness T (μm) | | | 60 | 60 | 60 | 60 | 60 | 60 | 60 | 60 | 60 | 60 | 60 |
| Step 2 | Ejected droplet amount of liquid II (pL) | | | 33 | 33 | 33 | 33 | 33 | 1 | 5 | 7 | 12 | 16 | — |
| | Average speed of droplets (m/s) | | | 15 | 15 | 15 | 15 | 15 | 8 | 8 | 8 | 8 | 8 | |
| | Average diameter d of droplets (μm) | | | 40 | 40 | 40 | 40 | 40 | 12 | 21 | 24 | 28 | 31 | — |
| | Impact viscosity p (dots/square inch) | | | 360000 | 288000 | 216000 | 144000 | 72000 | 2560000 | 360000 | 360000 | 360000 | 360000 | 0 |
| | Total energy of droplets E (mJ/m²) | | | 2273 | 1818 | 1364 | 909 | 455 | 266 | 147 | 197 | 317 | 410 | — |
| | Ratio (d/T) | | | 0.7 | 0.7 | 0.7 | 0.7 | 0.7 | 0.2 | 0.4 | 0.4 | 0.5 | 0.5 | — |
| Evaluation | Coating film No. | | | 2-1 | 2-2 | 2-3 | 2-4 | 2-5 | 2-6 | 2-7 | 2-8 | 2-9 | 2-10 | 2-C1 |
| | Whiteness (image density) | | | 0.21 | 0.28 | 0.39 | 0.52 | 0.72 | 0.12 | 0.14 | 0.15 | 0.17 | 0.19 | 1.58 |

From Table 3, it is noted that the coating films 2-1 to 2-5 obtained in Examples 2-1 to 2-5 exhibit a high whiteness as compared with the coating film 2-C1 obtained in Comparative Example 2-1 not performing the step 2 and make it possible to adjust the whiteness due to the impact density p of the droplets.

In addition, it is noted that the coating films 2-6 to 2-10 exhibit a high whiteness as compared with the coating film 2-C1 obtained in Comparative Example 2-1 not performing the step 2 and make it possible to adjust the whiteness by changing the ejected droplet amount, namely the average diameter d of the droplets.

Examples 3-1 to 3-5

Dried polymer coating films 3-1 to 3-5 were obtained in the same manner as in the step 2 of Example 1-2, except for changing the liquid II as described in Table 4.

Subsequently, the whiteness of a portion of each of the obtained polymer coating films to which the ion-exchanged water and ethanol in a proportion of them shown in Table 4 as the liquid II were applied was evaluated in the same manner as mentioned above. The results are shown in Table 4.

<Evaluation of Whiteness of Printed Part after Water Washing>

The whiteness of each of a portion (printed part) applied with the ion-exchanged water and a portion (non-printed part) not applied with the ion exchanged water before and after water washing was measured in the same manner as mentioned above. Furthermore, a ratio of whiteness of the printed part and the non-printed part after water washing was calculated. The results are shown in Table 5.

A photograph of the polymer coating film 4-1 before and after water washing, which was dried in the same manner as in the aforementioned steps 1 to 3 of Example 4-1, except that the printed image was changed to a thin line image prepared by forming seven thin lines having a line width of

TABLE 4

| | | | Example | | | | |
|---|---|---|---|---|---|---|---|
| | | | 3-1 | 3-2 | 3-3 | 3-4 | 3-5 |
| | Liquid composition I No. | | I1-2 | I1-2 | I1-2 | I1-2 | I1-2 |
| Step 1 | Composition (parts) | Solvent A Ethanol | 84 | 84 | 84 | 84 | 84 |
| | | Solvent B PARLEAM 3 | 10 | 10 | 10 | 10 | 10 |
| | | Polymer C ULTRAHOLD 8 | 3 | 3 | 3 | 3 | 3 |
| | | YUKA FORMER SM-dry | 3 | 3 | 3 | 3 | 3 |
| | Viscosity of liquid composition I (mPa · s) | | 12.2 | 12.2 | 12.2 | 12.2 | 12.2 |
| | Wet film thickness T (μm) | | 60 | 60 | 60 | 60 | 60 |
| | $y_I$ of liquid composition I (mN/m) | | 25 | 25 | 25 | 25 | 25 |
| Step 2 | Liquid II | No. | II-1 | II-2 | II-3 | II-4 | II-5 |
| | | Content of water (%) | 90 | 80 | 70 | 60 | 50 |
| | | Content of ethanol (%) | 10 | 20 | 30 | 40 | 50 |
| | | $y_{II}$ (mN/m) | 48 | 38 | 33 | 30 | 28 |
| | Ejected droplet amount of liquid II (pL) | | 33 | 33 | 33 | 33 | 33 |
| | Average speed of droplets (m/s) | | 15 | 15 | 15 | 15 | 15 |
| | Average diameter d of droplets (μm) | | 40 | 40 | 40 | 40 | 40 |
| | Difference of surface tension ($y_{II} - y_I$) (mN/m) | | 23 | 13 | 8 | 5 | 3 |
| Evaluation | | Coating film No. | 3-1 | 3-2 | 3-3 | 3-4 | 3-5 |
| | | Whiteness (image density) | 0.35 | 0.44 | 0.54 | 0.69 | 0.80 |

From Table 4, it is noted that the coating films 3-1 to 3-5 obtained in Examples 3-1 to 3-5 exhibit a high whiteness and exhibit high concealment even without containing an inorganic pigment. In addition, it is noted that the whiteness can be controlled due to the content of water in the liquid II.

Examples 4-1 to 4-5

(Steps 1 to 3)

Dried polymer coating films 4-1 to 4-5 were obtained in the same manner as in Example 1-2, except for changing the base material to a PET film (manufactured by Toray Industries, Inc., a trade name: LUMIRROR T-60) and changing the count of the wire bar such that the wet film thickness T of the liquid composition I became a value described in Table 5.

Subsequently, the whiteness of the portion of the obtained polymer coating film to which the ion-exchanged water was applied was evaluated in the same manner as mentioned above. The results regarding the whiteness of the printed part and the whiteness of the non-printed part before water washing are shown in Table 5.

(Step 4)

Subsequently, each of the obtained polymer coating films 4-1 to 4-5 was washed with running water of ion-exchanged water for 3 minutes. The coating film after water washing was evaluated by the following method.

Figure 6:
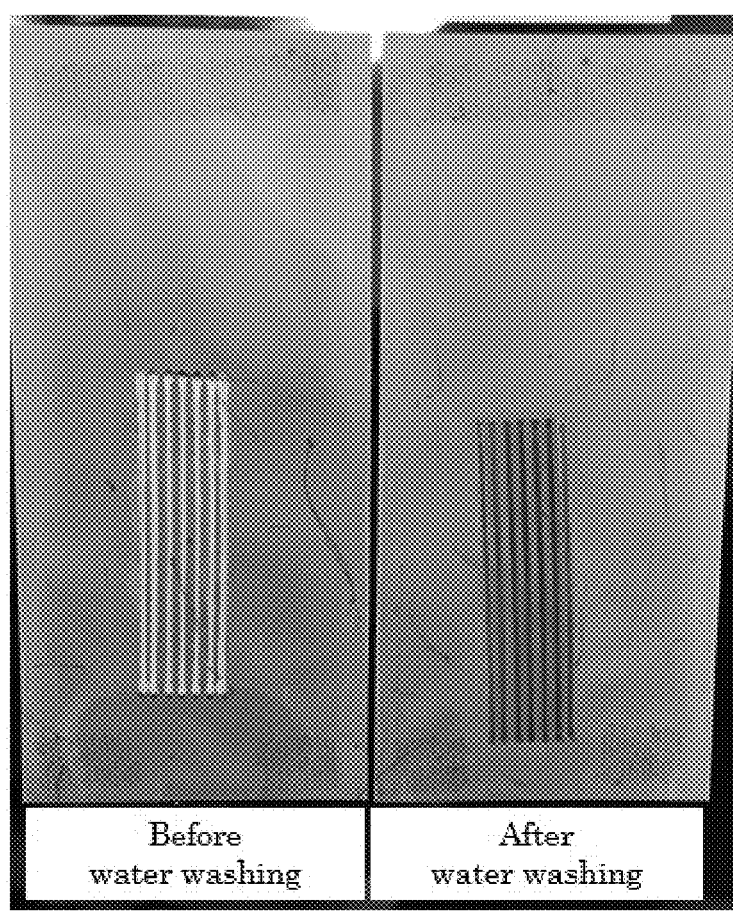
FIG. 6 is a photograph of a coating film obtained in Example 4-1 before and after water washing as taken from the upper surface side.
Figure 7:
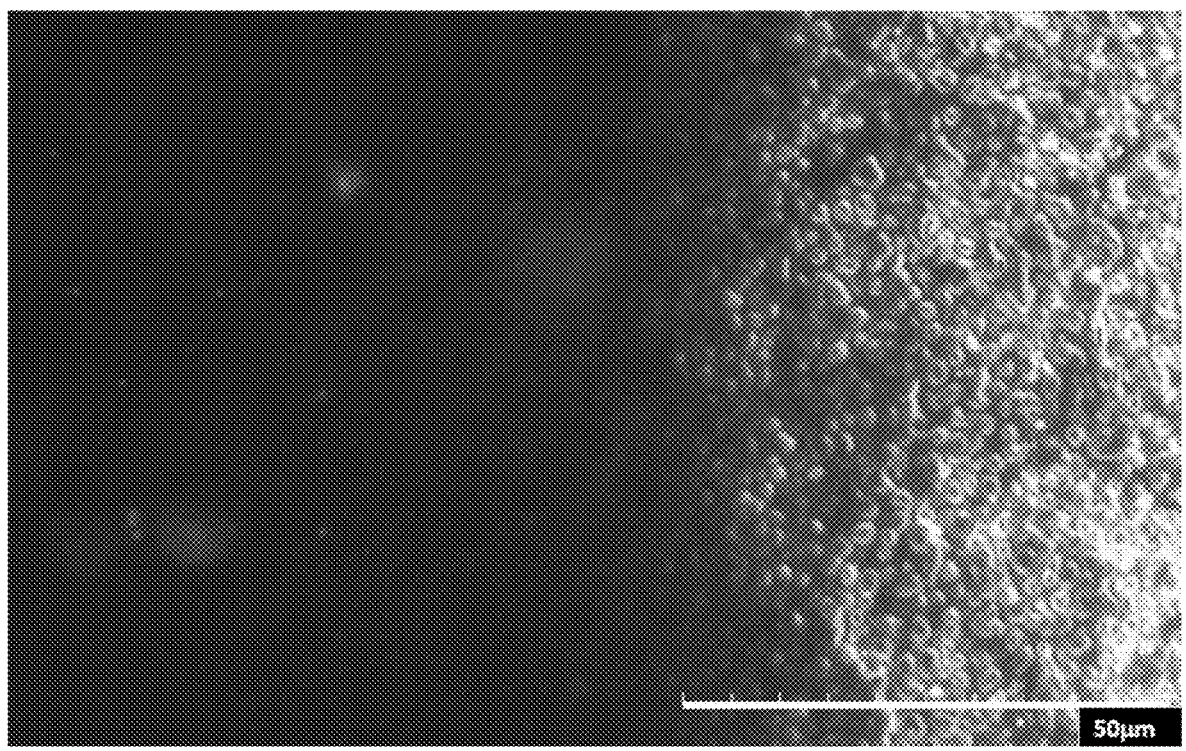
FIG. 7 is an optical microscopic photograph (magnification: 2,500 times) of a coating film obtained in Example 4-1 before and after water washing as taken from the upper surface side.

20 pixels, a space of 20 pixels, and a length of 50.8 mm at a resolution of 600 dpi in length and 600 dpi in width such that the long sides thereof were aligned parallel to each other, is shown in FIG. 6. In addition, an optical microscopic photograph (magnification: 2,500 times) of the polymer coating film after water washing is shown in FIG. 7.

Examples 4-6 to 4-10

Dried polymer coating films 4-6 to 4-10 were obtained in the same manner as in Example 2-7, except that the base material was changed to the aforementioned PET film, the count of the wire bar was changed such that the wet film thickness T of the liquid composition I became a value described in Table 5, and in the step 2 of Example 2-7, the ejected droplet amount of the liquid II was changed as shown in Table 5.

Subsequently, the evaluation of the whiteness of the printed part and the non-printed part of each of the obtained polymer coating films before and after water washing and the calculation of the ratio of whiteness of the printed part and the non-printed part after water washing were performed in the same manners as mentioned above. The results are shown in Table 5.

TABLE 5

|  |  |  |  | Example | | | | | | | | | |
|---|---|---|---|---|---|---|---|---|---|---|---|---|---|
|  |  | | | 4-1 | 4-2 | 4-3 | 4-4 | 4-5 | 4-6 | 4-7 | 4-8 | 4-9 | 4-10 |
|  | Liquid composition I No. | | | I1-2 | I1-2 | I1-2 | I1-2 | I1-2 | I1-2 | I1-2 | I1-2 | I1-2 | I1-2 |
| Step 1 | Composition (parts) | Solvent A | Ethanol | 84 | 84 | 84 | 84 | 84 | 84 | 84 | 84 | 84 | 84 |
|  |  | Solvent B | PARLEAM 3 | 10 | 10 | 10 | 10 | 10 | 10 | 10 | 10 | 10 | 10 |
|  |  | Polymer C | ULTRAHOLD 8 | 3 | 3 | 3 | 3 | 3 | 3 | 3 | 3 | 3 | 3 |
|  |  |  | YUKA FORMER SM-dry | 3 | 3 | 3 | 3 | 3 | 3 | 3 | 3 | 3 | 3 |
|  | Viscosity of liquid composition I (mPa · s) | | | 12.2 | 12.2 | 12.2 | 12.2 | 12.2 | 12.2 | 12.2 | 12.2 | 12.2 | 12.2 |
|  | Base material | | | | | | | PET film | | | | | |
|  | Wet film thickness T (μm) | | | 10 | 20 | 32 | 60 | 80 | 6 | 10 | 16 | 32 | 60 |
| Step 2 | Ejected droplet amount of liquid II (pL) | | | 33 | 33 | 33 | 33 | 33 | 5 | 5 | 5 | 5 | 5 |
|  | Average speed of droplets (m/s) | | | 15 | 15 | 15 | 15 | 15 | 8 | 8 | 8 | 8 | 8 |
|  | Average diameter d of droplets (μm) | | | 40 | 40 | 40 | 40 | 40 | 21 | 21 | 21 | 21 | 21 |
|  | Ratio (d/T) | | | 4.0 | 2.0 | 1.3 | 0.7 | 0.5 | 3.5 | 2.1 | 1.3 | 0.7 | 0.4 |
| Evaluation | Coating film No. | | | 4-1 | 4-2 | 4-3 | 4-4 | 4-5 | 4-6 | 4-7 | 4-8 | 4-9 | 4-10 |
|  | Whiteness in the printed part before water washing | | | 0.56 | 0.51 | 0.43 | 0.21 | 0.16 | 0.65 | 0.62 | 0.52 | 0.41 | 0.14 |
|  | Whiteness in the non-printed part before water washing | | | 0.58 | 0.57 | 0.55 | 0.44 | 0.35 | 0.69 | 0.58 | 0.57 | 0.55 | 0.44 |
|  | Whiteness in the printed part after water washing | | | 2.15 | 2.14 | 2.10 | 0.25 | 0.18 | 2.16 | 2.13 | 2.11 | 0.42 | 0.15 |
|  | Whiteness in the non-printed part after water washing | | | 0.58 | 0.56 | 0.54 | 0.43 | 0.34 | 0.68 | 0.58 | 0.57 | 0.54 | 0.43 |
|  | Ratio of whiteness of the printed part and the non-printed part after water washing | | | 3.71 | 3.82 | 3.89 | 0.58 | 0.53 | 3.18 | 3.67 | 3.70 | 0.78 | 0.35 |

From Table 5, it is noted that the printed parts of the coating films 4-1 to 4-10 obtained in Examples 4-1 to 4-10 exhibit a high whiteness and exhibit high concealment even without containing an inorganic pigment.

In addition, as shown in FIG. 6, it is noted that in the coating film 4-1 obtained in Example 4-1, the ratio (d/T) is more than 1, and therefore, the whiteness of the printed part (thin line part) before water washing is high, and the thin line image free from consolidation of the adjacent thin lines to each other is formed. It is noted that after water washing, the base material is exposed, the whiteness of the printed part is lowered, and the primary particles of the printed part flow out.

Furthermore, as shown in the optical microscopic photograph of the thin line image of FIG. 7, it is noted that in the thin line image of the coating film 4-1 after water washing, it can be confirmed that in the non-printed part, the primary particles remain, whereas in the printed part, the primary particles are not confirmed, the base material is exposed, and the thin line part vanishes. This phenomenon was similarly confirmed in the coating films 4-2 to 4-3 and 4-6 to 4-8 obtained in Examples 4-2 to 4-3 and 4-6 to 4-8 in which the ratio (d/T) is more than 1.

From the change in whiteness of the printed part before and after water washing as described in Table 5, the presence or absence of the coating film on the base material can be controlled by water washing, a pattern can be formed very simply, and therefore, the printed image constituted of the coating film can be obtained. By forming such a pattern on the base material, on the occasion of intentionally changing the surface energy, the contact angle, and the shape of a desired area on the base material surface and applying another preparation onto a succeeding base material, the attachment amount to the base material, permeability, adhesiveness, and so on can be changed.

Example 5-1

A dried polymer coating film 5-1 was obtained in the same manner as in Example 1-2, except that the temperature and humidity conditions in the environmental chamber were changed to 25° C. for the temperature and to 10% for the humidity.

Subsequently, the whiteness of the portion of the obtained polymer coating film 5-1 to which the ion-exchanged water was applied was evaluated in the same manner as mentioned above. The results are shown in Table 6.

Examples 5-2 to 5-4

The step 1 and the step 2 were performed in the same manner as in Example 1-2, except that the temperature and humidity conditions in the environmental chamber were changed to 25° C. for the temperature and to 10% for the humidity.

Furthermore, as the step 3, for a drying time shown in Table 6, in Example 5-2, cold air drying at a temperature of 25° C. was performed; in Example 5-3, warm air drying at a temperature of 60° C. was performed; and in Example 5-4, a drying treatment was performed upon heating at 60° C. by bringing a heater (manufactured by Hakko Electric Co., Ltd, a coated thermocouple-equipped silicone rubber heater) into contact with the surface of the base material at the opposite side to the surface on which the coating film was formed. There were thus obtained dried polymer coating films 5-2 to 5-4.

Subsequently, the whiteness of the portion of each of the obtained polymer coating films 5-2 to 5-4 to which the ion-exchanged water was applied was evaluated in the same manner as mentioned above. The results are shown in Table 6.

<Evaluation of Whiteness Expression Speed>

In the evaluation of the whiteness, after applying ion-exchanged water, the whiteness was measured every minute, and a time necessary until the value of whiteness became stable was measured, thereby evaluating the whiteness expression speed. On the occasion of measuring the whiteness, at the point of time when a difference from the whiteness measured one minute ago became 0.1 or less was considered such that the whiteness became stable, and that time was recorded, whereby the whiteness on that occasion was evaluated. The results are shown in Table 6. As the time until the whiteness becomes stable is shorter, such is more preferred. The case where the time is 30 minutes or shorter is not practically problematic.

TABLE 6

|  |  |  |  | Example | | | |
|---|---|---|---|---|---|---|---|
|  |  |  |  | 5-1 | 5-2 | 5-3 | 5-4 |
|  | Liquid composition I No. |  |  | I1-2 | I1-2 | I1-2 | I1-2 |
| Step 1 | Composition (parts) | Solvent A | Ethanol | 84 | 84 | 84 | 84 |
|  |  | Solvent B | PARLEAM 3 | 10 | 10 | 10 | 10 |
|  |  | Polymer C | ULTRAHOLD 8 | 3 | 3 | 3 | 3 |
|  |  |  | YUKA FORMER SM-dry | 3 | 3 | 3 | 3 |
|  | Viscosity of liquid composition I (mPa·s) |  |  | 12.2 | 12.2 | 12.2 | 12.2 |
|  | Wet film thickness T (μm) |  |  | 60 | 60 | 60 | 60 |
| Step 2 | Ejected droplet amount of liquid II (pL) |  |  | 33 | 33 | 33 | 33 |
|  | Average speed of droplets (m/s) |  |  | 15 | 15 | 15 | 15 |
|  | Average diameter d of droplets (μm) |  |  | 40 | 40 | 40 | 40 |
| Step 3 | Drying treatment | Kind of drying |  | Stationary drying | Cold air drying | Warm air drying | Heating from the lower part of base material |
|  |  | Drying temperature |  | 25° C. | 25° C. | 60° C. | 60° C. |
|  |  | Drying time |  | 10 min | 1 min | 1 min | 1 min |
| Evaluation | Coating film No. |  |  | 5-1 | 5-2 | 5-3 | 5-4 |
|  | Whiteness expression speed [Time until the whiteness becomes stable (min)] |  |  | 10 | 1 | 1 | 1 |
|  | Whiteness (image density) |  |  | 0.21 | 0.21 | 0.21 | 0.21 |

From Table 6, it is noted that the coating films 5-1 to 5-4 obtained in Examples 5-1 to 5-4 quickly express a high whiteness and exhibit high concealment even without containing an inorganic pigment.

Preparation Examples 6-1 to 6-15 and 7-1 to 7-18

<Preparation of Liquid Composition I>

Each of the polymers C shown in Table 7 and Table 8 was dissolved in absolute ethanol as the solvent A; after confirming that the solution was transparent and free from a floating material and a precipitate, PAIRLEAM 3 as the solvent B was added; the contents were stirred and homogenized; and the resultant was filtered with a cellulose acetate syringe filter having a pore diameter of 0.20 μm, manufactured by Advantech Co., Ltd. There were thus obtained liquid compositions I6-1 to I6-15 and I7-1 to I7-18.

The dissolved amount of each of the polymers C used in Preparation Examples 6-1 to 6-15 and 7-1 to 7-18 in 100 g of the solvent B was less than 5 g, and the dissolved amount thereof in 100 g of the solvent A was 5 g or more.

Examples 6-1 to 6-15 and 7-1 to 7-18

Dried coating films 6-1 to 6-15 and 7-1 to 7-18 were obtained in the same manner as in Example 1-1, except for changing the liquid composition I-1 to the liquid composition I as shown in Table 7 and Table 8, respectively.

Subsequently, the whiteness of the portion of each of the obtained polymer coating films to which the ion-exchanged water was applied was evaluated in the same manner as mentioned above. The results are shown in Table 7 and Table 8.

TABLE 7

|  |  |  |  |  | Example | | | | | | | | | | | | | | | |
|---|---|---|---|---|---|---|---|---|---|---|---|---|---|---|---|---|---|---|---|---|
|  |  |  |  |  | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 |
|  | Liquid composition I No. |  |  |  | I6-1 | I6-2 | I6-3 | I6-4 | I6-5 | I6-6 | I6-7 | I6-8 | I6-9 | I6-10 | I6-11 | I6-12 | I6-13 | I6-14 | I6-15 |
| Step 1 | Composition (parts) | Solvent A |  | Ethanol | 74 | 74 | 74 | 74 | 74 | 74 | 74 | 74 | 74 | 74 | 74 | 74 | 74 | 74 | 74 |
|  |  | Solvent B |  | PARLEAM 3 | 20 | 20 | 20 | 20 | 20 | 20 | 20 | 20 | 20 | 20 | 20 | 20 | 20 | 20 | 20 |
|  |  | Polymer C | Anionic polymer CI | ULTRAHOLD 8 |  | 6 |  |  |  |  | 3 |  |  |  |  |  | 3 | 3 | 3 | 3 |
|  |  |  |  | ULTRAHOLD STRONG |  |  | 6 |  |  |  |  | 3 |  |  |  |  | 3 |  |  |  |
|  |  |  |  | ULTRAHOLD POWER-dry |  |  |  | 6 |  |  |  |  |  | 3 |  |  |  |  |  |  |
|  |  |  | Cationic polymer CII-1 | Cationic polymer 1 |  |  |  |  | 6 |  |  |  |  |  | 3 |  |  |  |  |  |
|  |  |  |  | Cationic polymer 2 |  |  |  |  |  | 6 |  |  |  |  |  | 3 |  |  |  |  |

TABLE 7-continued

| | | | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 |
|---|---|---|---|---|---|---|---|---|---|---|---|---|---|---|---|---|---|
| | Liquid composition I No. | | I6-1 | I6-2 | I6-3 | I6-4 | I6-5 | I6-6 | I6-7 | I6-8 | I6-9 | I6-10 | I6-11 | I6-12 | I6-13 | I6-14 | I6-15 |
| | Betaine polymer CIII | YUKA FORMER SM-dry | 6 | | | | | | 3 | 3 | 3 | 3 | 3 | | | | |
| | | RAM RESIN 1000-dry | | | | | | | | | | | | | 3 | | |
| | | RAM RESIN 2000-dry | | | | | | | | | | | | | | 3 | |
| | | RAM RESIN 4000-dry | | | | | | | | | | | | | | | 3 |
| | Viscosity of liquid composition I (mPa·s) | | 7.0 | 2.9 | 5.1 | 9.3 | 16.3 | 19.7 | 13.1 | 94.3 | 11.4 | 7.3 | 8.1 | 3.8 | 12.1 | 4.8 | 10.3 |
| | Wet film thickness (μm) | | 60 | 60 | 60 | 60 | 60 | 60 | 60 | 60 | 60 | 60 | 60 | 60 | 60 | 60 | 60 |
| Step 2 | Ejected droplet amount of liquid II (pL) | | 33 | 33 | 33 | 33 | 33 | 33 | 33 | 33 | 33 | 33 | 33 | 33 | 33 | 33 | 33 |
| | Average speed of droplets (m/s) | | 15 | 15 | 15 | 15 | 15 | 15 | 15 | 15 | 15 | 15 | 15 | 15 | 15 | 15 | 15 |
| | Average diameter d of droplets (μm) | | 40 | 40 | 40 | 40 | 40 | 40 | 40 | 40 | 40 | 40 | 40 | 40 | 40 | 40 | 40 |
| Evaluation | Coating film No. | | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 |
| | Whiteness (image density) | | 0.32 | 0.50 | 0.55 | 0.56 | 0.49 | 0.48 | 0.15 | 0.25 | 0.42 | 0.31 | 0.26 | 0.46 | 0.47 | 0.24 | 0.31 |

TABLE 8

| | | | Example | | | | | | | | | | | | | | | | | |
|---|---|---|---|---|---|---|---|---|---|---|---|---|---|---|---|---|---|---|---|---|
| | | | 7-1<br>I7-1 | 7-2<br>I7-2 | 7-3<br>I7-3 | 7-4<br>I7-4 | 7-5<br>I7-5 | 7-6<br>I7-6 | 7-7<br>I7-7 | 7-8<br>I7-8 | 7-9<br>I7-9 | 7-10<br>I7-10 | 7-11<br>I7-11 | 7-12<br>I7-12 | 7-13<br>I7-13 | 7-14<br>I7-14 | 7-15<br>I7-15 | 7-16<br>I7-16 | 7-17<br>I7-17 | 7-18<br>I7-18 |
| Step 1 | Composition (parts) | Liquid composition I No. | | | | | | | | | | | | | | | | | | |
| | | Solvent A Ethanol | 74 | 74 | 74 | 74 | 74 | 74 | 74 | 74 | 74 | 74 | 74 | 74 | 74 | 74 | 74 | 74 | 74 | 74 |
| | | Solvent B PARLEAM 3 | 20 | 20 | 20 | 20 | 20 | 20 | 20 | 20 | 20 | 20 | 20 | 20 | 20 | 20 | 20 | 20 | 20 | 20 |
| | Polymer C | Anionic polymer CI ULTRAHOLD 8 | 3 | | | | | | | | | | | | | | | | | |
| | | ULTRAHOLD STRONG | | 3 | 3 | 3 | | | | | | | | | | | | | | |
| | | ULTRAHOLD POWER-dry | | | | | 3 | 3 | 3 | 3 | | | | | | | | | | |
| | | Cationic polymer CII-1 Cationic polymer 1 | | | | | | | | | 3 | | | | | | | | | |
| | | Cationic polymer 2 | | | | | | | | | | 3 | | | | | | | | |
| | | Cationic silicone polymer 1 | | | | | | | | | | | 3 | | | | | | | |
| | | Cationic silicone polymer 2 | | | | | | | | | | | | 3 | | | | | | |
| | | Cationic polymer CII-2 Cationic silicone polymer 3 | | | | | | | | | | | | | 3 | 3 | | | | |
| | | Betaine polymer YUKA FORMER SM-dry | | | | | | | | | | | | | | | 3 | | | |
| | | Nonionic polymer CIII Polyvinyl butyral | | | | | | | | | | | | | | | | 2 | 6 | |
| | | Polyurethane-polyurea | | | | | | | | | | | | | | | | | | 6 |
| | Viscosity of liquid composition I (mPa·s) | | 5.2 | 22.3 | 7.0 | 2.9 | 6.6 | 9.1 | 3.6 | 4.1 | 7.8 | 5.4 | 6.9 | 5.1 | 5.7 | 7.8 | 5.5 | 6.5 | 25.3 | 4.8 |
| | Wet film thickness (μm) | | 60 | 60 | 60 | 60 | 60 | 60 | 60 | 60 | 60 | 60 | 60 | 60 | 60 | 60 | 60 | 60 | 60 | 60 |
| Step 2 | Ejected droplet amount of liquid II (pL) | | 33 | 33 | 33 | 33 | 33 | 33 | 33 | 33 | 33 | 33 | 33 | 33 | 32 | 23 | 33 | 33 | 33 | 33 |
| | Average speed of droplets (m/s) | | 15 | 15 | 15 | 15 | 15 | 15 | 15 | 15 | 15 | 15 | 15 | 15 | 15 | 15 | 15 | 15 | 15 | 15 |
| | Average diameter d of droplets (μm) | | 40 | 40 | 40 | 40 | 40 | 40 | 40 | 40 | 40 | 40 | 40 | 40 | 40 | 40 | 40 | 40 | 40 | 40 |
| Evaluation | Coating film No. | | 7-1 | 7-2 | 7-3 | 7-4 | 7-5 | 7-6 | 7-7 | 7-8 | 7-9 | 7-10 | 7-11 | 7-12 | 7-13 | 7-14 | 7-15 | 7-16 | 7-17 | 7-18 |
| | Whiteness (image density) | | 0.50 | 0.56 | 0.48 | 0.40 | 0.42 | 0.46 | 0.44 | 0.48 | 0.35 | 0.44 | 0.44 | 0.38 | 0.44 | 0.47 | 0.33 | 0.32 | 0.93 | 0.92 |

From Table 7 and Table 8, it is noted that the coating films 6-1 to 6-15 obtained in Examples 6-1 to 6-15 and the coating films 7-1 to 7-18 obtained in Examples 7-1 to 7-18 express a high whiteness and exhibit high concealment even without containing an inorganic pigment. According to this, the polymer C can be widely used so long as it is soluble in the solvent A but insoluble in the solvent B.

Preparation Examples 8-1 to 8-10

<Preparation of Liquid Composition I>

Each of the polymers C shown in Table 9 was dissolved in absolute ethanol as the solvent A; after confirming that the solution was transparent and free from a floating material and a precipitate, the solvent B as shown in Table 9 was added; the contents were stirred and homogenized; and the resultant was filtered with a cellulose acetate syringe filter having a pore diameter of 0.20 μm, manufactured by Advantech Co., Ltd. There were thus obtained liquid compositions I8-1 to I8-10.

The dissolved amount of each of the polymers C used in Preparation Examples 8-1 to 8-10 in 100 g of the solvent B was less than 5 g, and the dissolved amount thereof in 100 g of the solvent A was 5 g or more.

Examples 8-1 to 8-10

Dried coating films 8-1 to 8-10 were obtained in the same manner as in Example 1-1, except for changing the liquid composition I1-1 to the liquid composition I as shown in Table 9.

Subsequently, the whiteness of the portion of each of the obtained polymer coating films to which the ion-exchanged water was applied was evaluated in the same manner as mentioned above. The results are shown in Table 9.

INDUSTRIAL APPLICABILITY

In accordance with the present invention, a coating film having a high whiteness and excellent concealment is obtained even without using an inorganic pigment, and a coating film capable of exhibiting optical characteristics simply and precisely can be formed.

REFERENCE SIGNS LIST

1: Liquid composition I
2: Droplet
3: Base material

The invention claimed is:

1. A method for forming a coating film, the method comprising:
    1: applying a liquid composition I comprising a solvent A, a solvent B, and a polymer C to a base material; and
    2: applying droplets of a liquid II comprising water to the liquid composition I on the base material as applied in the applying 1, wherein:
    a boiling point of the solvent A is lower than 99° C., and a distance Ra of the Hansen solubility parameter of the solvent A to water as expressed by the following equation (1) is 36 or less,
    a boiling point of the solvent B is 150° C. or higher, and a distance Ra of the Hansen solubility parameter of the solvent B to water as expressed by the following equation (1) is 40 or more,
    the solvent B is compatible with the solvent A,
    the polymer C is soluble in the solvent A but insoluble in the solvent B, and
    an average diameter d of the droplets applied in the applying 2 is 0.01 μm or more and 50 μm or less, $$Ra = (4 \times \Delta D^2 + \Delta P^2 + \Delta H^2)^{0.5} \quad (1)$$

TABLE 9

| | | | | | Example | | | | | | | | | |
|---|---|---|---|---|---|---|---|---|---|---|---|---|---|---|
| | Liquid composition I No. | | | 8-1 | 8-2 | 8-3 | 8-4 | 8-5 | 8-6 | 8-7 | 8-8 | 8-9 | 8-10 |
| | | Kind | Boiling point (° C.) | Ra | I8-1 | I8-2 | I8-3 | I8-4 | I8-5 | I8-6 | I8-7 | I8-8 | I8-9 | I8-10 |
| Step 1 | Composition (parts) | Solvent A | Ethanol (boiling point: 78° C., Ra: 24) | | 88 | 86 | 84 | 79 | 74 | 69 | 64 | 74 | 88 | 88 |
| | | Solvent B | PARLEAM 3 | 179 | 45 | 6 | 8 | 10 | 15 | 20 | 25 | 30 | | | |
| | | | PARLEAM 4 | 262 | 45 | | | | | | | | 20 | | |
| | | | KF-96A-1CS | 153 | 45 | | | | | | | | | 6 | |
| | | | TMF-1.5 | 191 | 45 | | | | | | | | | | 6 |
| | | Polymer C | ULTRAHOLD 8 | | | 3 | 3 | 3 | 3 | 3 | 3 | 3 | 3 | 2 | 2 |
| | | | Cationic silicone polymer 3 | | | | | | | | | | | 2 | 2 |
| | | | YUKA FORMER SM-dry | | | 3 | 3 | 3 | 3 | 3 | 3 | 3 | 3 | 2 | 2 |
| | Viscosity of liquid composition I (mPa · s) | | | | 12.0 | 12.1 | 12.4 | 12.9 | 13.1 | 13.9 | 14.4 | 16.0 | 12.0 | 14.0 |
| | Wet film thickness (μm) | | | | 60 | 60 | 60 | 60 | 60 | 60 | 60 | 60 | 60 | 60 |
| Step 2 | Ejected droplet amount of liquid II (pL) | | | | 33 | 33 | 33 | 33 | 33 | 33 | 33 | 33 | 33 | 33 |
| | Average speed of droplets (m/s) | | | | 15 | 15 | 15 | 15 | 15 | 15 | 15 | 15 | 15 | 15 |
| | Average diameter d of droplets (μm) | | | | 40 | 40 | 40 | 40 | 40 | 40 | 40 | 40 | 40 | 40 |
| Evaluation | Coating film No. | | | | 8-1 | 8-2 | 8-3 | 8-4 | 8-5 | 8-6 | 8-7 | 8-8 | 8-9 | 8-10 |
| | Whiteness (image density) | | | | 0.36 | 0.28 | 0.23 | 0.21 | 0.15 | 0.20 | 0.25 | 0.15 | 0.45 | 0.50 |

From Table 9, it is noted that the coating films 8-1 to 8-10 obtained in Examples 8-1 to 8-10 express a high whiteness and exhibit high concealment even without containing an inorganic pigment. According to this, it is noted that so far as the solvent B has predetermined physical properties, the effects of the present invention are obtained without relying on the kind thereof.

wherein,
    $\Delta D$ is a difference of dispersing component in the Hansen solubility parameter between a solvent and water,
    $\Delta P$ is a difference of polar component in the Hansen solubility parameter between a solvent and water, and ΔH is a difference of hydrogen-binding component in the Hansen solubility parameter between a solvent and water.

2. The method for forming a coating film according to claim 1, wherein a content of water in the liquid II is 50% by mass or more.

3. The method for forming a coating film according to claim 1, wherein in the applying 2, a total energy E brought by the droplets to be applied to the liquid composition I on the base material is 8.0 mJ/m$^2$ or more and 4,000 mJ/m$^2$ or less, wherein the total energy is a sum of a motion energy $E_M$ and a surface free energy $E_S$.

4. The method for forming a coating film according to claim 1, wherein in the applying 2, the method for applying the droplets is an inkjet method.

5. The method for forming a coating film according to claim 4, wherein an impact density p of the droplets in terms of the number of dots per square inch is 10,000 or more and 3,000,000 or less.

6. The method for forming a coating film according to claim 1, wherein a difference between a surface tension $\gamma_I$ of the liquid composition I and a surface tension $\gamma_{II}$ of the liquid II ($\gamma_{II} - \gamma_I$) is 1 mN/m or more.

7. The method for forming a coating film according to claim 1, wherein the solvent A is a monohydric alcohol having 1 or more and 4 or less carbon atoms.

8. The method for forming a coating film according to claim 1, wherein the solvent B comprises 50% by mass or more of at least one selected from the group consisting of a hydrocarbon oil and a silicone oil each having a weight average molecular weight of 150 or more and 1,000 or less.

9. The method for forming a coating film according to claim 1, wherein the polymer C is an ionic polymer.

10. The method for forming a coating film according to claim 1, wherein the polymer C comprises, as a monomer constitutional unit, at least one selected from the group consisting of a monomer having an acidic group, a monomer having a basic group, and a betaine monomer.

11. The method for forming a coating film according to claim 10, wherein the betaine monomer is at least one selected from the group consisting of a carboxybetaine monomer, a sulfobetaine monomer, and a phosphobetaine monomer.

12. The method for forming a coating film according to claim 1, wherein the polymer C comprises an anionic polymer CI comprising a constitutional unit derived from a monomer having an acidic group; and at least one selected from the group consisting of a cationic polymer CII-1 comprising a constitutional unit derived from a monomer having a basic group, a cationic silicone polymer CII-2, and a betaine polymer CIII comprising a constitutional unit derived from a betaine monomer.

13. The method for forming a coating film according to claim 1, wherein the polymer C comprises an anionic polymer CI comprising a constitutional unit derived from a monomer having an acidic group; and a betaine polymer CIII comprising a constitutional unit derived from a betaine monomer.

14. The method for forming a coating film according to claim 1, wherein the method further comprises
3: drying the coating film obtained in the applying 2, wherein the drying 3 is performed after the applying 2.

15. The method for forming a coating film according to claim 14, wherein
a ratio (d/T) of the average diameter d of the droplets applied in the applying 2 to a film thickness before drying T of the liquid composition I applied in the applying 1 is more than 1, and
the method further comprises 4: water washing the coating film obtained in the applying 2 or the drying 3, wherein the water washing 4 is performed after the applying 2 or the drying 3.

16. The method for forming a coating film according to claim 1, wherein a ratio (d/T) of an average diameter d of the droplets applied in the applying 2 to a film thickness before drying T of the liquid composition I applied in the applying 1 is less than 1.

17. The method for forming a coating film according to claim 1, wherein a content of the solvent A in the liquid composition I is 50% by mass or more and 90% by mass or less.

18. The method for forming a coating film according to claim 1, wherein a content of the solvent B in the liquid composition I is 5% by mass or more and 40% by mass or less.

19. The method for forming a coating film according to claim 1, wherein a content of the polymer C in the liquid composition I is 2% or more and 15% by mass or less.

20. The method for forming a coating film according to claim 1, wherein a mass ratio of the content of the solvent A to that of the solvent B in the liquid composition I [(solvent A)/(solvent B)] is 0.01 or more and 50 or less.

* * * * *